US011870891B2

(12) United States Patent
Dugardin et al.

(10) Patent No.: US 11,870,891 B2
(45) Date of Patent: Jan. 9, 2024

(54) CERTIFICATELESS PUBLIC KEY ENCRYPTION USING PAIRINGS

(71) Applicant: SECURE-IC SAS, Cesson-Sevigne (FR)

(72) Inventors: Margaux Dugardin, Rennes (FR); Adrien Facon, Paris (FR); Sylvain Guilley, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 323 days.

(21) Appl. No.: 17/299,772

(22) PCT Filed: Dec. 6, 2019

(86) PCT No.: PCT/EP2019/083943
§ 371 (c)(1),
(2) Date: Jun. 3, 2021

(87) PCT Pub. No.: WO2020/115265
PCT Pub. Date: Jun. 11, 2020

(65) Prior Publication Data
US 2022/0021526 A1 Jan. 20, 2022

(30) Foreign Application Priority Data
Dec. 6, 2018 (EP) .................................... 18306629

(51) Int. Cl.
*H04L 9/08* (2006.01)
*H04L 9/30* (2006.01)
*H04L 9/32* (2006.01)

(52) U.S. Cl.
CPC .......... *H04L 9/0847* (2013.01); *H04L 9/0869* (2013.01); *H04L 9/0894* (2013.01);
(Continued)

(58) Field of Classification Search
CPC ... H04L 9/0847; H04L 9/0869; H04L 9/0894; H04L 9/3073; H04L 9/321; H04L 9/3236
See application file for complete search history.

(56) References Cited

U.S. PATENT DOCUMENTS 7,239,701 B1    7/2007  Ogishi et al.
8,694,771 B2 *  4/2014  Malek ...................... H04L 9/30
                                                    713/165
(Continued)

FOREIGN PATENT DOCUMENTS

EP        1 519 530 A1      3/2005
WO     2013/116928 A1      8/2013
WO   WO-2013116928 A1 *   8/2013    ............... H04L 9/00

OTHER PUBLICATIONS

Al-Riyami, et al., "Certificateless Public Key Cryptography", International Association for Cryptologic Research, vol. 20031021:122149, pp. 1-40, Oct. 21, 2003.
(Continued)

*Primary Examiner* — Hee K Song
(74) *Attorney, Agent, or Firm* — BakerHostetler

(57) ABSTRACT

A transmitter device for sending an encrypted message to a receiver device in an identity-based cryptosystem, the transmitter device being associated with a transmitter identifier. The transmitter device is configured to receive a transmitter partial private key from a trusted center, the transmitter device being configured to: send a request for two public session keys to the receiver device; receive from the receiver device a first ciphertext set, the first ciphertext set being derived from an encryption and authentication of two public session keys; decrypt and authenticate the two public session keys from the first ciphertext set using a receiver identifier and the transmitter partial private key; determine a second ciphertext set from the transmitter partial private key, from the receiver identifier, and from the two public session keys,
(Continued)

the second ciphertext comprising an encrypted message;
send the second ciphertext set to the receiver device.

9 Claims, 10 Drawing Sheets

(52) U.S. Cl.
CPC ............ *H04L 9/3073* (2013.01); *H04L 9/321* (2013.01); *H04L 9/3236* (2013.01)

(56) References Cited

U.S. PATENT DOCUMENTS

| | | | |
|---|---|---|---|
| 9,774,610 B2* | 9/2017 | Zheng | H04L 63/126 |
| 2005/0089173 A1 | 4/2005 | Harrison et al. | |
| 2013/0212377 A1* | 8/2013 | Malek | H04L 9/0825 |
| | | | 713/155 |
| 2017/0034186 A1* | 2/2017 | Zheng | H04L 9/083 |
| 2022/0038267 A1* | 2/2022 | Dugardin | H04L 9/321 |

OTHER PUBLICATIONS

Shamir, "Identity-Based Cryptosystems and Signature Schemes", Advances in Cryptology, pp. 47-53, Crypto, 1984.
Boneh, et al., "Identity-Based Encryption from the Weil Pairing", Advances in Cryptology, Crypto, 2001.
Cocks, "An Identity-Based Encryption Scheme Based on Quadratic Residues", Cryptography and Coding, 2001.

* cited by examiner

CERTIFICATELESS PUBLIC KEY ENCRYPTION USING PAIRINGS

CROSS-REFERENCE TO RELATED APPLICATIONS

This application is a National Stage of International patent application PCT/EP2019/083943, filed on Dec. 6, 2019, which claims priority to foreign European patent application No. EP 18306629.9, filed on Dec. 6, 2018, the disclosures of which are incorporated by reference in their entirety.

TECHNICAL FIELD

The invention generally relates to cryptosystems and in particular to the security of identity-based encryption systems.

BACKGROUND

Cryptographic mechanisms are used in many fields to protect stored, processed, and transferred information against interceptors or eavesdroppers. Several keyed cryptographic algorithms exist. They rely on the use of secret/private information to protect data and provide confidentiality, integrity, authenticity, and non-repudiation services.

In key-based cryptographic systems, cryptographic keys are used to generate ciphertext data from original data through an encryption mechanism and to recover the original data through a decryption mechanism. The encryption mechanism uses an encryption key, while the decryption mechanism uses a decryption key. The encryption key and the decryption key may be either similar or different.

In symmetric-key cryptosystems, the encryption key and the decryption key are the same, the same cryptographic key being used for encryption of original data and decryption of plaintext. The encryption and decryption keys in symmetric-key cryptosystems represent a shared secret between the users that is used to maintain a private information link. Exemplary symmetric-key cryptosystems comprise the Diffie-Hellman key exchange method, and the AES (Advanced Encryption Standard) cryptosystems.

In public-key cryptosystems, the encryption key and the decryption key are different. More specifically, in a public-key cryptosystem, each user of the cryptosystem generates a pair of encryption key/decryption key. The encryption key, also referred to as a public key, is a public value that the user publishes/disseminates to the remaining users of the cryptosystem. The decryption key, also referred to as a private key, is secret and kept known only by the owner. Any user of a public-key cryptosystem can encrypt a message using the public key of the recipient. The encrypted message can only be decrypted with the private key of the recipient. Public-key cryptosystems allow public key encryption, ensure confidentiality, and allow digital signatures in which a message can be signed with a user's private key and verified with the user's public key. Exemplary public-key cryptosystems comprise the RSA (Rivest-Shamir-Adleman) cryptosystems.

A major challenge of public-key cryptosystems is to ensure the authenticity of public keys, which involves ensuring that a particular public key is correct, belongs to the claimed user, and has not been tampered or replaced by a malicious third party. In order to guarantee the authenticity of public keys, existing public-key cryptosystems use a public key infrastructure in which one or more certificate authorities certify ownership of public/private keys.

In "A. Shamir, Identity-Based Cryptosystems and Signature Schemes, In: Blakley G. R., Chaum D. (eds) Advances in Cryptology, CRYPTO 1984", Shamir proposed a novel type of public cryptographic schemes, referred to as 'identity-based cryptosystems'. The identity-based cryptosystems and signature schemes enable a secure communication of message and verification of signatures between the users of a cryptosystem without exchanging private or public keys. Such cryptosystems comprise a center referred to as a 'trusted center' or a 'public-key generation center' and rely on the use of an identity information that uniquely identifies each user in the cryptosystem to generate a public/private key common to each user. The role of the trusted center is to give to each user a private key when the user first joins the system. During a setup step, the trusted center determines, from a given security parameter, global system parameters and a secret master key. The global system parameters are then made public to all the users. Then, during a key generation step, the trusted center receives the identity information of each user, computes a private key in association with the identity information, and sends to each user his private key. The trusted computes the private keys of all the users in the system using the global system parameters and the secret master key it previously determined from the security parameter. Messages are encrypted by the users using the global system parameters and the identity information of the receiver of the encrypted message, used as a public key. Encrypted messages are decrypted using the global system parameters and the private key associated with the identity information that was used in the encryption step as encryption key.

Several identity-based cryptographic schemes have been developed, including:
"D. Boneh and M. K. Franklin, Identity-Based Encryption from the Weil Pairing, In: Kilian J. (eds) Advances in Cryptology, CRYPTO 2001";
"C. Cocks, An Identity-Based Encryption Scheme Based on Quadratic Residues, In: Honary B. (eds) Cryptography and Coding. Cryptography and Coding 2001";
"S. S. Al-Riyami and K. G. Paterson, Certificateless Public Key Cryptography, In: Laih CS. (eds) Advances in Cryptology—ASIACRYPT 2003";
Patent application No. EP1519530A1 that describes a method for establishing an encrypted communication by means of keys;
U.S. Pat. No. 7,239,701 B1;
US Patent No. US 2005/0089173 A1; and
Patent No. WO2013116928A1 that describes the Verifiable Identity Based Encryption Protocol in which a method for sending encrypted messages over possible unsecured channels is developed.

The security of identity-based cryptosystems depends on the security of the cryptographic functions implemented to determine the private keys, on the secrecy of the information stored at the trusted center (e.g. the master key, the private keys of the users), the identity checks performed by the trusted center before delivering private keys to the users based on their identity information, and on the actions taken by the users to safely hold their private keys and prevent their loss, duplication, or unauthorized access/use.

In existing identity-based encryption schemes, the trusted center knows all the private keys of all the users since it determined the private keys from each identity information associated with each user. The knowledge of the private keys allows the trusted center to completely decrypt any encrypted message. This problem is known as the key escrow problem. If an attacker recovers the master key that the trusted center uses to determine the private keys from the identity information associated with each user, the attacker can have access to each sent message. If a corruption of the master key occurs, then the trusted center must generate another master key and must re-compute and re-distribute all the private keys for all the users in the system.

There is accordingly a need for securing identity-based cryptosystems against the key escrow problem and more generally, there is a need for developing secured identity-based cryptosystems.

SUMMARY

In order to address these and other problems, there is provided a transmitter device for sending an encrypted message to a receiver device in an identity-based cryptosystem, the transmitter device being associated with a transmitter identifier. The transmitter device may be configured to receive a transmitter partial private key from a trusted center, the transmitter device being configured to:

send a request for two public session keys to the receiver device;

receive from the receiver device a first ciphertext set, the first ciphertext set being derived from an encryption and authentication of two public session keys;

decrypt and authenticate the two public session keys from the first ciphertext set using a receiver identifier and the transmitter partial private key;

determine a second ciphertext set from the transmitter partial private key, from the receiver identifier, and from the two public session keys, the second ciphertext comprising an encrypted message;

send the second ciphertext set to the receiver device.

According to some embodiments, the transmitter partial private key may depend on the transmitter identifier associated with the transmitter device.

According to some embodiments, the identity-based cryptosystem may be associated with system parameters comprising an admissible bilinear map, a first cryptographic hash function, a second cryptographic hash function, a third cryptographic hash function, and a trusted center public key associated with the trusted center, the first ciphertext set comprising a first ciphertext, a second ciphertext, a third ciphertext, a fourth ciphertext, and a fifth ciphertext. The transmitter device may be configured to:

apply the first cryptographic hash function to the receiver identifier, which provides a receiver public key;

apply a subtraction operation between (i) the second ciphertext, and (ii) the output of the second cryptographic hash function applied to the bilinear map applied to the transmitter partial private key and to the first ciphertext, which provides a secret key;

apply a decipher to the third ciphertext, which provides a recovered first public session key, the decipher using the secret key as a decryption key;

apply the decipher to the fourth ciphertext, which provides a recovered second public session key;

apply the third cryptographic hash function to the secret key, to the recovered first public session key, and to the recovered second public session key, which provides a recovered intermediate value;

check if the fifth ciphertext is equal to the output of the second cryptographic hash function applied to an input value, the input value being the output of the bilinear map applied to (iii) the transmitter partial private key, and (iv) to the receiver public key to the power the recovered intermediate value.

According to some embodiments, the transmitter device may be configured to check whether a trusted center identity verification condition and/or a public session keys verification condition are verified, the trusted center identity verification condition being satisfied if the output of the bilinear map applied to the transmitter partial private key and to the trusted center public key is equal to the output of the bilinear map applied to:

the result of the first cryptographic hash function applied to the transmitter identifier, and the result of the first cryptographic hash function applied to the trusted center identifier, the public session keys comprising a first public session key and a second public session key, the public session keys verification condition being satisfied if the output of the bilinear map applied to the first public session key and to the result of the first cryptographic hash function applied to the transmitter identifier is equal to the output of the bilinear map applied to the second public session key and to the transmitter partial private key.

According to some embodiments, the second ciphertext set may further comprise a first component, a second component, and a third component, the transmitter device being configured to:

generate a random secret key;

apply the first cryptographic hash function to the receiver identifier, which provides a receiver public key;

apply a third cryptographic hash function to the random secret key and to a given message, which provides an auxiliary value;

apply an exponentiation function of a base equal to a trusted center public key and an exponent equal to the auxiliary value, which provides the first component;

add the random secret key to the output of the second cryptographic hash function applied to the result of the bilinear map applied to the first public session key to the power the auxiliary value and to the receiver device public key, which provides the second component;

apply a cipher to a given message using the random secret key, which provides an encrypted message;

apply a second cryptographic hash function to the result of the bilinear map to the power the auxiliary value, the bilinear map being applied to the transmitter partial private key and to the receiver public key, which provides the third component.

There is also provided a receiver device for receiving an encrypted message from a transmitter device, the transmitter device being associated with a transmitter identifier, the receiver device being configured to determine two public session keys from a receiver partial private key associated with the receiver device and from system parameters, the receiver device being configured to send a first ciphertext set to the transmitter device, the receiver device being configured to determine the first ciphertext set from an encryption of the two public session keys, the receiver device being configured to receive a second ciphertext set from the transmitter device comprising the encrypted message, the second ciphertext set depending on a transmitter partial private key received from a trusted center, a receiver identifier associated with the receiver device, and the two public session keys, the receiver device being configured to recover the original message by decrypting the encrypted message and authenticating the transmitter device.

According to some embodiments, the system parameters may comprise a prime number, two algebraic groups of order equal to the prime number, an admissible bilinear map, a first cryptographic hash function, a second cryptographic hash function, a third cryptographic hash function, and a trusted center public key associated with a trusted center identifier.

According to some embodiments, the receiver partial private key may depend on a receiver identifier associated with the receiver device.

According to some embodiments, the receiver device may be configured to verify a trusted center public key associated with the trusted center using the receiver partial private key and to determine a private session key, two public session keys comprising a first public session key and a second public session key, and a first ciphertext set if a verification condition is satisfied, the verification condition being satisfied if the receiver device determines that a first value is equal to a second value, the first value being determined by applying the bilinear map to the receiver device partial private key and to the trusted center public key, the second value being determined by applying the bilinear map to the output of the first cryptographic hash function applied to the receiver identifier and to the output of the first cryptographic hash function applied to the trusted center identifier.

According to some embodiments, the receiver device may be configured to determine a random value and to determine the private session key by applying an exponentiation function of a base equal to the receiver partial private key and an exponent equal to the random value, the two public session keys comprising a first public session key and a second public session key, the receiver device being configured to determine the first public session key by applying an exponentiation function of a base equal to the output of the application of the first cryptographic hash function to a trusted center identifier and an exponent equal to said random value, and to determine the second public session key by applying an exponentiation function of a base equal to the trusted center public key and an exponent equal to the random value.

According to some embodiments, the first ciphertext set may comprise a first ciphertext, a second ciphertext, a third ciphertext, a fourth ciphertext, and a fifth ciphertext, the receiver device being configured to randomly generate a random secret key, the receiver device being configured to determine a transmitter public key by applying the first cryptographic hash function to the transmitter device identifier, and to determine a first intermediate value by applying the third cryptographic hash function to the random secret key, to the first public session key, and to the second public session key, the receiver device being further configured to:

determine the first ciphertext by applying an exponentiation function of a basis equal to the trusted user public key and an exponent equal to the first intermediate value;

add the random secret key to a value, which provides the second ciphertext, the value being the result the second cryptographic hash function applied to the output of the bilinear map applied to a first input and a second input, the first input being the result of an exponentiation function having a basis given by the transmitter device public key and an exponent given by said intermediate value, the second input being of the result of the first cryptographic hash function to applied to the trusted center identifier;

determine the third ciphertext by applying a cipher algorithm to the first public session key, the cipher algorithm using the random secret key as encryption key;

determine the fourth ciphertext by applying a cipher algorithm to the second public session key; and determine the fifth ciphertext by applying a second cryptographic hash function to the output of the application of the bilinear map exponent the first intermediate value, the output being obtained by applying the bilinear map to the receiver partial private key and the transmitter public key.

According to some embodiments, the second ciphertext set further comprises a first component, a second component, and a third component, the first component, the receiver device being configured to:

determine a transmitter public key by applying the first cryptographic hash function to the transmitter identifier;

determine a secret key by applying a subtraction operation to the second component comprised in the second ciphertext set and to the output of the application of the second cryptographic hash function to the result of the application of the bilinear map to the first component comprised in the second ciphertext set and to the private session key;

determine the original message by decrypting the encrypted message using a decipher that uses the secret key as a decryption key;

determine an auxiliary value by applying the third cryptographic hash function to the secret key and the original message; and verify the identity of the transmitter device by checking if a transmitter identity verification condition is satisfied, the transmitter identity verification condition being satisfied if the receiver device determines that the third component comprised in the second ciphertext set is equal to the output of the second cryptographic hash function applied to an output result to the power of the auxiliary value, the output result being determined by the application of the bilinear map to the transmitter device public key and the receiver device partial private key.

There is also provided an identity-based cryptosystem comprising a trusted center, the trusted center being configured to determine system parameters and a master private key from a trusted center security parameter and a trusted center identifier, the system parameters comprising a prime number, two algebraic groups of order equal to the prime number, an admissible bilinear map, a first cryptographic hash function, a second cryptographic hash function, a third cryptographic hash function, and a trusted center public key associated with the trusted center identifier, the trusted center being configured to:

generate the prime number, the two algebraic groups and the admissible bilinear map by running a Bilinear Diffie-Hellman parameter generator that takes as input the trusted center security parameter;

select a first cryptographic hash function, a second cryptographic hash function, and a third cryptographic hash function from a predefined set of cryptographic hash functions;

determine a first value by applying the first cryptographic hash function to the trusted center identifier;

randomly select a master secret key; and determine the trusted center public key by applying an exponentiation function defined by a base and an exponent, the base being equal to the first value, and the exponent being equal to the master private key.

According to some embodiments, the trusted center may be configured to determine a transmitter partial private key and a receiver partial private key from the master secret key, the system parameters, a transmitter identifier and a receiver identifier, the trusted center being configured to determine a transmitter public key by applying the first hash function to a transmitter device identifier and to determine the transmitter partial private key by applying an exponentiation function defined by a base and an exponent, the base being equal to the transmitter public key, and the exponent being equal to the inverse of the master secret key, the trusted center being configured to determine a receiver public key by applying the first hash function to the receiver identifier and to determine the receiver partial private key by applying an exponentiation function defined by a base and an exponent, the base being equal to the receiver public key, and the exponent being equal to the inverse of the master secret key.

Advantageously, the embodiments of the invention enable resolving the key escrow problem, the trusted center having no access to the messages sent between the users and having only access to partial private keys of the users.

Advantageously, the embodiments of the invention enable assuring the forward secrecy between the users and the protection of the messages sent and to be sent between the users against any corruption occurring on the master key hold by the trusted center.

Advantageously, the identity-based cryptosystem according to the embodiments of the invention provide and guarantee data confidentiality between the users and authentication of the users that the identity of each sender and each recipient can be verified.

Further advantages of the present invention will become clear to the skilled person upon examination of the drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention provide devices and methods for secured, confidential, and authenticated exchange of messages between a pair of users, comprising a sender (also referred to herein as a 'transmitter', a 'sender device' or a 'transmitter device') and a recipient (also referred to hereinafter as a 'receiver', a 'recipient device' or a 'receiver device'), in an identity-based encryption cryptosystem (also referred to as a 'cryptographic system').

Figure 1:
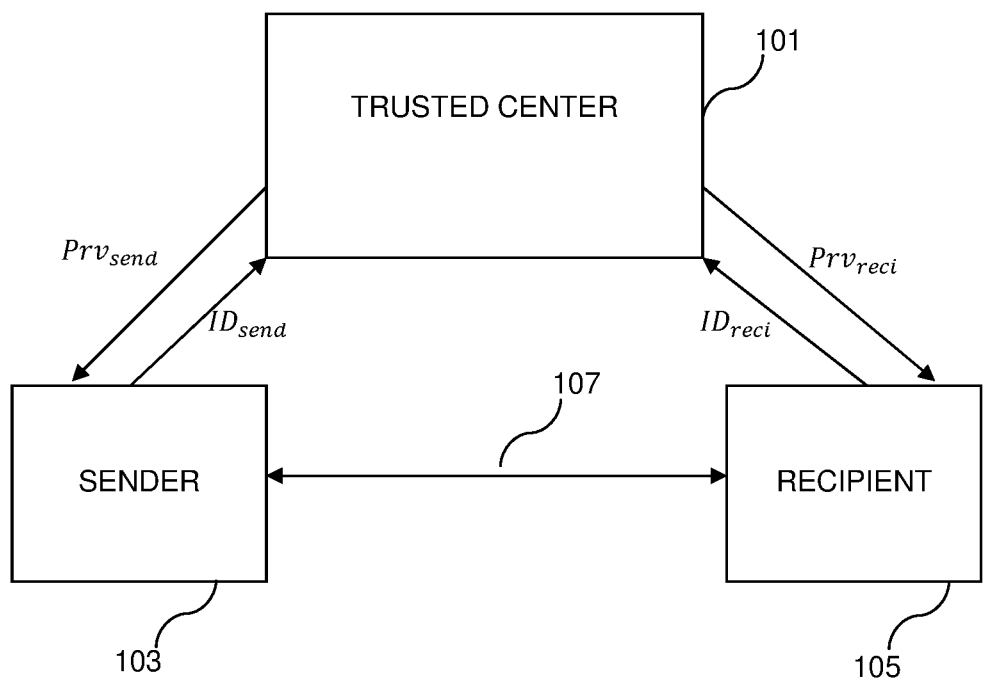
FIG. 1 is a schematic diagram of an exemplary implementation of the invention in a cryptosystem 100.

Referring to FIG. 1, there is shown a cryptosystem 100 in which the embodiments of the invention may be applied. The cryptosystem 100 may comprise a sender 103 and a recipient 105 connected via a link 107 and a trusted center 101.

The sender 103 and the recipient 105 may be any user, user device, equipment, object, entity, configured to operate in the cryptosystem 100. More specifically, the sender 103 may be any user device, user equipment, user object, or user apparatus configured or configurable to determine an encrypted message from original data and to transmit the encrypted message to the recipient 105. The recipient 105 may be any user device, user equipment, user object, or user apparatus configured or configurable to receive the encrypted message transmitted over the link 107 and to decrypt the encrypted message to recover original data. It should be noted that in the figures, the sender 103 and the recipient 105 are labeled according to the direction of transmission and reception of encrypted messages. However, in practice, the sender 103 and the recipient 105 may be any transceivers devices capable of transmitting and receiving data in any cryptosystem 100.

In some embodiments, the sender 103 and the recipient 105 may be any cryptographic device that implement hardware and/or software cryptographic functions for ensuring data and/or signals security, encryption, authentication, protection, and privacy. As used herein, a 'cryptographic device' encompasses any device, computer, computing machine, or embedded system, programmed and/or programmable to perform cryptographic functions for the generation and the use of cryptographic keys. Exemplary cryptographic devices include, without limitation:

smartcards, tokens to store keys such as wallets, smartcards readers such as Automated Teller Machines (ATM) used for example in financial transactions, restricted access, telecommunications, military applications, secure communication equipments, and TV set-top boxes;

electrical and digital electronic devices such as RFID tags and electronic keys;

embedded secure elements;

computers (e.g. desktop computers and laptops), tablets; routers, switches, printers;

mobile phones such as smartphones, base stations, relay stations, satellites;

Internet of Thing (IoT) devices, robots, drones; and recorders, multimedia players, mobile storage devices (e.g. memory cards and hard discs) with logon access monitored by cryptographic mechanisms.

The embodiments of the invention may be applied in any a cryptosystem 100, which may be used in different applications in storage, information processing, or communication systems.

For example, in an application of the invention to storage systems, the cryptosystem 100 may represent a storage system, infrastructure, or network, the sender 103 and/or the recipient 105 being part of such cryptosystem and comprising one or more storage devices configured to store or use encrypted data (e.g. memory cards or hard discs).

In an application of the invention to information processing, the cryptosystem 100 may be for example a computer system (e.g. a small or large area wired or wireless access network), a database, an online sale system or a financial system comprising a sender 103 and a recipient 105 configured to secure the data used and/or stored in the system (such as personal financial or medical data).

In an application of the invention to communication systems, the cryptosystem 100 may be wired/wireless/optical/radio communication network in which at least one sender 103 is configured to transmit, over a medium 107 that can be unsecure, encrypted data to at least one recipient 105.

Original data may correspond to text files, video, audio, or any other media data.

The sender 103 and/or the recipient 105 may be fixed such as a computer operating in a wired communication system, or mobile, such as a user terminal operating in a radio or wireless network.

The link 107 may correspond to a network (e.g. Internet-based network, computer network) or to any communication medium (wired, wireless, or optical).

The sender 103 and the recipient 105 may be configured to select the trusted center 101 in the cryptosystem 100 and to identify the trusted center by its identity information. The sender 103 may be further configured to select the recipient 105 among the users of the cryptosystem 100.

The trusted center 101 may be connected to the sender 103 and the recipient 105. The trusted center 101 may be a device, an entity, or a system such as an organization (e.g. a social public organization, headquarters of a corporation) configured or configurable to generate private keys associated with the identity information of the users when they join the cryptosystem 100.

According to some embodiments, the trusted center 101 may be a system administrator, a dedicated server, or a server that is part of a distributed network.

Each user in the cryptosystem 100 may be associated with an identity information, also referred to as 'an identifier', that uniquely identifies the user in the cryptosystem 100. In some embodiments, an identifier may be one or a combination of two or more identifiers chosen in a group comprising an identity sequence, a name, a username, a network address, a social security number, a street address, an office number, a telephone number, an electronic mail address associated with a user, a date, an Internet Protocol address belonging to a network host. An identifier associated with each user may be any public, cryptographically unconstrained string that is used in conjunction with public data of the trusted center 101 to perform data encryption or signing.

In the following description of some embodiments, the identity information associated with the sender 103 will also be referred to the 'sender identifier' or 'transmitter identifier', the identity information associated with the recipient 105 will be referred to as the 'recipient identifier' or 'receiver identifier', and the identity information associated with the trusted center will be also referred to as the 'trusted center identifier'.

Each of the sender identifier, the recipient identifier, and the trusted center identifier may be strings that belong to the set $\{0,1\}^*$.

In order to facilitate the understanding of the various embodiments of the invention, the following definitions are provided:

$n \in \mathbb{N}$ designates a non-zero natural number;

$\lambda \in \mathbb{Z}^+$ is a positive value integer number designating a security parameter (also referred to a trusted center security parameter);

$p \in \mathbb{N}$ designates a prime number;

$\mathbb{F}_2 = \mathbb{Z}/2\mathbb{Z}$ designates a Euclidean domain (also called a Euclidean ring) and $\mathbb{F}_2[x]$ designates the ring of polynomials having coefficients that belong to the Euclidean ring $\mathbb{F}_2$;

G and $G_T$ designate two groups of order p;

e: $G \times G \rightarrow G_T$ designates a bilinear map;

$H_1: \{0,1\}^n \rightarrow G$ designates a first cryptographic hash function;

$H_2: G_T \rightarrow \{0,1\}^n$ designates a second cryptographic hash function;

$H_3: \{0,1\}^n \times \{0,1\}^n \rightarrow \mathbb{Z}_p^n$ designates a third cryptographic hash function;

$\mathcal{M} = \{0,1\}^n$ represents a finite message space, i.e. the space to which belongs each message (also referred to as an 'original message' or a 'plaintext message', or a 'plaintext');

$M \in \mathcal{M}$ designates a plaintext message;

$\mathcal{C} = G^* \times \{0,1\}^n$ represents a finite ciphertext space, i.e. the space to which belongs each encrypted message (also referred to as a 'ciphertext' or a 'ciphertext message');

$C(M) \in \mathcal{C}$ designates a ciphertext message computed by encrypting the plaintext message M;

$ID_{TC}$ refers to the trusted center identifier;

$ID_{send}$ refers to the sender identifier (also referred to as a 'transmitter identifier');

$ID_{reci}$ refers to the recipient identifier (also referred to as a 'receiver identifier');

$g_{pub}$ refers to a trusted center public key;

$g_{send}$ refers to a sender public key (also referred to as a 'transmitter public key');

$g_{reci}$ refers to a recipient public key (also referred to as a 'receiver public key');

$Prv_{send}$ refers to a sender partial private key (also referred to as a 'transmitter partial private key') associated with the sender public key $g_{send}$;

$Prv_{reci}$ refers to a recipient partial private key (also referred to as a 'receiver partial private key') associated with the recipient public key $g_{reci}$;

s refers to a master secret key;

$pub_1$ refers to a first public session key;

$pub_2$ refers to a second public session key;

sk refers to a private session key;

$E_\sigma(.)$ designates a cipher (also referred to as a 'ciphertext algorithm') that uses a cryptographic key $\sigma$ as encryption key and $D_\sigma(.)$ designates the decipher associated with the cipher $E_\sigma(.)$ such that a message encrypted using the cipher $E_\sigma(.)$ is successfully recovered only if it is decrypted with the decipher $D_\sigma(.)$ that uses the cryptographic key $\sigma$ as a decryption key. The cipher is symmetric.

The embodiments of the invention provide a sender 103 operable to transmit an encrypted message C(M) to a recipient 105 in an identity-based cryptosystem 100 that comprises a trusted center 101, the sender 103 and the recipient 105 being configured to communicate over the link 107 securely, independently, and without accessing the trusted center 101. Accordingly, the transmission of encrypted messages from the sender 103 to the recipient 105 may be completed without contacting the trusted center 101. In the identity-based cryptosystem 100, the sender 103 is associated with a sender identifier $ID_{send}$ and the recipient is associated with a recipient identifier $ID_{reci}$, and both the sender 103 and the recipient 105 are connected to the trusted center 101.

The trusted center 101 may be configured to initiate the setup of the cryptosystem 100 and to manage the generation and distribution of the private keys of the users including the sender 103 and the recipient 105. Accordingly, the trusted center 101 may be configured to receive the sender identifier $ID_{send}$ from the sender 103 and the recipient identifier $ID_{reci}$ from the recipient 105 and to determine a sender partial private key $Prv_{send}$ from the sender identifier $ID_{send}$ and a recipient partial private key $Prv_{reci}$ from the recipient identifier $ID_{reci}$ The trusted center 101 has accordingly only access to a part of the private keys of the sender 103 and the recipient 105. The trusted center 101 may be further configured to distribute the partial private keys, i.e. to send the sender partial private key to the sender 103 and to send the recipient partial private key to the recipient 105. Once the trusted center 101 delivered the partial private keys to the sender 103 and the recipient 105, the sender partial private key and the recipient partial private key may not need to be updated, for example if new users join the cryptosystem 100. The trusted center 101 may be closed after the sender and recipient partial private keys are issued and the cryptosystem 100 may continue to operate in a completely decentralized manner for an indefinite period.

According to the embodiments of the invention, the sender 103 may be configured to send the encrypted message using two exchange steps with the recipient 105 that involve the use and authentication of two additional public session keys, $pub_1$ and $pub_2$.

Accordingly, the sender 103 may be configured to send a request to the recipient 105 asking for two public session keys $pub_1$ and $pub_2$.

Upon reception of the two public session keys request sent from the sender 103, the recipient 105 may be configured to determine a private session key sk and two public session keys $pub_1$ and $pub_2$ from the recipient partial private key $Prv_{reci}$ and system parameters denoted by PK and to determine a first ciphertext set denoted by $C_1$ from encryption and authentication of the two public keys $pub_1$ and $pub_2$. The sender 103 may be configured to receive the first ciphertext set from the recipient 105.

After receiving the first ciphertext set C, the sender 103 may be configured to decrypt and authenticate the two public session keys from the first ciphertext set denoted by $C_1$ using the recipient identifier $ID_{reci}$ and the sender partial private key $Prv_{send}$.

The operations performed so far by the sender 103 enable providing two public session keys $pub_1$ and $pub_2$ to the sender 103, the two public session keys being securely and authentically sent from the recipient 105.

Now, the sender 103 operates in the second phase of the exchange of data to securely and authentically send the encrypted message C(M) to the recipient 105.

Accordingly, the sender 103 may be configured to determine a second ciphertext set denoted by $C_2$ from the sender partial private key $Prv_{send}$, the recipient identifier $ID_{reci}$ and the two public keys $pub_1$ and $pub_2$, the second ciphertext set comprising an encrypted message C(M).

The sender 103 may be configured to send the second ciphertext set $C_2$ to the recipient 105, the recipient 105 being configured to recover the original message M by decrypting the encrypted message C(M) comprised in the received second ciphertext set and authenticating the sender 103.

The trusted center 101 has secret information that enables it to compute the partial private keys of all the users in the cryptosystem 100. More specifically, the trusted center 101 may be configured to hold a security parameter denoted by $\lambda \in \mathbb{ZZ}^+$ and a trusted center identifier $ID_{TC}$ and to generate system parameters PK and a master private key (also referred to as a 'master secret key') s from the security parameter $\lambda$ and the trusted center identifier $ID_{TC}$. The system parameters denoted by PK={$p$, G, $G_T$, e, $H_1$, $H_2$, $H_3$, $gp_{ub}$} comprise a prime number $p$, two algebraic groups G and $G_T$ of order equal to the prime number p, an admissible bilinear map e, a first cryptographic hash function $H_1$, a second cryptographic hash function $H_2$, a third cryptographic hash function $H_3$, and a trusted center public key g $p_{ub}$ associated with the trusted center identifier $ID_{TC}$.

When computed, the trusted center 101 makes the system parameters known publicly, i.e. to all the users in the cryptosystem including the sender 103 and the recipient 105. The trusted center 101 keeps, however, the master private key sk private and known only to the trusted center 101.

The security parameter $\lambda$ is used to determine the system parameters and the master private key. In particular, the security parameter may allow to determine the size, in bits, of the master private key such that s $\in \mathbb{Z}_p^n$, with n being a non-zero natural number. The security parameter may be also used to determine the size of the prime number in bits. For example, the prime number may be selected to be a random $\lambda$-bits prime number.

According to some embodiments, the bilinear map e may be based on a Weil pairing or a Tate pairing defined on a subgroup of an elliptic curve. In such embodiments, the elements of the algebraic group G may be points on an elliptic curve.

According to some embodiments, the trusted center 101 may be configured to determine the system parameters and the master private key by applying a setup algorithm that takes as input the security parameter $\lambda$ and the trusted center identifier $ID_{TC}$ and returns as outputs the system parameters PK and a master private key sk. According to the setup algorithm, the trusted center 101 may be configured to generate a prime number p, the two algebraic groups G and $G_T$ and an admissible bilinear map e by running a Bilinear Diffie-Hellman parameter generator that takes as input the security parameter $\lambda$ and outputs a prime number $p$, the description of two groups G and $G_T$ and the description of an admissible bilinear map e: G×G→$G_T$.

Given the security parameter, the trusted center 101 may be configured to select, among a predefined set of cryptographic hash functions, a first cryptographic hash function $H_1$: $\{0,1\}^n$ G, a second cryptographic hash function $H_2$: $G_T$→$\{0,1\}^n$, and a third cryptographic hash function $H_3$:$\{0,1\}^n \times \{0,1\}^n \to \mathbb{Z}_p^n$. The cryptographic hash function $H_1$, $H_2$ and $H_3$ may be random oracles.

The trusted center 101 may be then configured to determine a first value denoted by g by applying the first cryptographic hash function $H_1$ to the trusted center identifier $ID_{T_c}$ such that $g=H_1(ID_{TC})$.

The trusted center 101 may be further configured to randomly select a master secret key $s \in \mathbb{Z}_p^*$ and to determine a trusted center public key $g_{pub}$ by applying an exponentiation function defined by a base and an exponent, the base being equal to the first value g, and the exponent being equal to the master private key s such that $g_{pub}=g^s$.

In embodiments in which the first value g corresponds to a point of an elliptic curve, the exponentiation function may be reduced to a scalar multiplication function according to which the trusted center public key $g_{pub}$ is determined according to $g_{pub}=[s]g$.

The sender 103 and the recipient 105 may ask the trusted center 101 to send them their partial private keys. The sender 103 may send the sender identifier $ID_{send}$ to the trusted center 101 and ask it to receive the sender partial private key $Prv_{send}$. The recipient 105 may send the recipient identifier $ID_{reci}$ to the trusted center 101 and ask it to receive the recipient partial private key $Prv_{reci}$. Upon reception of the requests sent by the sender 103 and the recipient 105, the trusted center 101 may be configured to determine the sender partial private key and the recipient partial private key from the master secret key s, the system parameters PK, and the sender identifier $ID_{send}$ and the recipient identifier $ID_{reci}$ by applying a KeyGen1 algorithm that takes as input the master secret key, the sender identifier, the recipient identifier, and the system parameters, and outputs the sender partial private key and the recipient partial private key. Accordingly, the trusted center 101 may be configured to determine a sender public key $g_{send}$ by applying the first hash function $H_1$ to the sender identifier $ID_{send}$ such that a $g_{send}=H_1(ID_{send})$ and to determine the sender partial private key $Prv_{send}$ by applying an exponentiation function defined by a base and an exponent, the base being equal to the sender public key $g_{send}$, and the exponent being equal to the inverse of the master secret key $$\frac{1}{s}$$

such that $$Prv_{send} = g_{send}^{\frac{1}{s}}.$$

In embodiments in which the sender public key corresponds to a point of an elliptic curve, the exponentiation function may be replaced with a scalar multiplication function according to $$Prv_{send} = \left[\frac{1}{s}\right] Prv_{send}.$$

Similarly, the trusted center 101 may configured to determine a recipient public key $g_{reci}$ by applying the first hash function $H_1$ to the recipient identifier $ID_{reci}$ such that a $g_{reci}=H_1(ID_{reci})$ and to determine the recipient partial private key $Prv_{reci}$ by applying an exponentiation function defined by a base and an exponent, the base being equal to the recipient public key $g_{reci}$, and the exponent being equal to the inverse of the master secret key $$\frac{1}{s}$$

such that $$Prv_{reci} = g_{reci}^{\frac{1}{s}}.$$

In embodiments in which the recipient public key corresponds to a point of an elliptic curve, the exponentiation function may be replaced with a scalar multiplication function according to which $$Prv_{reci} = \left[\frac{1}{s}\right] g_{reci}.$$

According to the embodiments of the invention, the sender 103 encrypts an original message M and sends the encrypted message C(M) to the recipient 105 using public session keys that are determined by the recipient 105.

According to some embodiments, before determining the public session keys $pub_1$ and $pub_2$, the recipient 105 may be configured to verify the trusted center public key $g_{pub}$ using the recipient partial private key $Prv_{reci}$. The recipient 105 may be configured to determine a private session key sk, the two public session keys $pub_1$ and $pub_2$, and a first ciphertext set $C_1$ if a verification condition is satisfied by applying a KenGen2 algorithm that takes as inputs the recipient partial private key and the system parameters and outputs a private session key and two public session keys. The verification condition may be satisfied if the recipient 105 determines that a first value $e(Prv_{reci}, g_{pub})$ is equal to a second value $e(H_1(ID_{reci}), H_1(ID_{TC}))$, the first value being determined by the application of the bilinear map e to the recipient partial private key $Prv_{reci}$ and to the trusted center public key $g_{pub}$, the second value being determined by the application of the bilinear map e to the output $H_1(ID_{reci})$ of the first cryptographic hash function $H_1$ applied to the recipient identifier $ID_{reci}$ and to the output $H_1(ID_{TC})$ of the first cryptographic hash function $H_1$ applied to the trusted center identifier $ID_{TC}$. If the verification condition is satisfied, i.e. if the recipient 105 determines that $e(Prv_{reci}, g_{pub})=e(H_1(ID_{reci}), H_1(ID_{TC}))$, then the recipient 105 computes a private session key and two public session keys. If the verification condition is not satisfied, i.e. if the recipient 105 determines that $e(Prv_{reci}, g_{pub}) \neq e(H_1(ID_{reci}), H_1(ID_{TC}))$, then the recipient 105 aborts and does not compute the private and public session keys.

In embodiments in which the verification condition $e(Prv_{reci}, g_{pub})=e(H_1(ID_{reci}), H_1(ID_{TC}))$ is satisfied, the recipient 105, according to the KeyGen2 algorithm, may be configured to determine a random value denoted by $\beta$ and to determine a private session key sk by applying an exponentiation function of a base equal to the recipient partial private key $Prv_{reci}$ and an exponent equal to the random value $\beta$ such that $sk=Prv_{reci}^\beta$. In embodiments in which the recipient partial private key $Prv_{reci}$ corresponds to a point of an elliptic curve, the exponentiation function may be reduced to a scalar multiplication function according to which the private session key sk is determined according to $sk=[\beta]Prv_{reci}$. In such embodiments, the exponent is a scalar value.

The recipient 105 may be further configured to determine the two public session keys comprising a first public session key $pub_1$ and a second public session key $pub_2$ by applying exponentiation function. More specifically, the recipient 105 may be configured to determine the first public session key $pub_1$ by applying an exponentiation function of a base equal to the output $H_1(ID_{TC})$ of the application of the first cryptographic hash function $H_1$ to the trusted center identifier $ID_{TC}$ and an exponent equal to the random value $\beta$ such that $pub_1 = (H_1(ID_{TC}))^\beta$. In embodiments in which the output $H_1(ID_{TC})$ corresponds to a point of an elliptic curve, the exponentiation function may be replaced by a scalar multiplication according to which $pub_1 = [\beta]H_1(ID_{TC})$.

The recipient 105 may be configured to determine the second public session key $pub_2$ by applying an exponentiation function of a base equal to the trusted center public key $gp_{ub}$ and an exponent equal to the random value $\beta$ such that $pub_2 = g_{pub}^\beta = (H_1(ID_{TC}))^{\beta s}$. In embodiments in which the trusted center public key $gp_{ub}$ corresponds to a point of an elliptic curve, the exponentiation function may be reduced to a scalar multiplication function according to which the second public session key $pub_2$ is determined according to $pub_2 = [\beta]gp_{ub}$. In such embodiments, the exponent $\beta s$ a scalar value.

The private session key sk may be used for the conversation between the sender 103 and the recipient 105, i.e. the exchange of encrypted messages. The two public session keys may be used to authenticate the sender 103 and the recipient 105.

After generating the public session keys, the recipient 105 may be configured to determine a first ciphertext set $C_1$ to be sent to the sender 103 to communicate the public session keys in an encrypted and authenticated way by applying an Encrypt1 algorithm that takes as inputs the sender identifier, the sender partial private key, the recipient identifier, the two public session keys and the system parameters, and outputs a first ciphertext set. The first ciphertext set $C_1 = \{V_1, U_1, W_{11}, W_{12}, Y_1\}$ comprises a first ciphertext $V_1$, a second ciphertext $U_1$, a third ciphertext $W_{11}$, a fourth ciphertext $W_{12}$, and a fifth ciphertext $Y_1$. The recipient 105 may be configured to first verify the trusted center public key using the recipient partial private key by checking if the verification condition $e(Prv_{reci}, gp_{ub}) = e(H_1(ID_{reci}), H_1(ID_{TC}))$ is satisfied. If the recipient 105 determines that the verification condition is satisfied, then it generates the first ciphertext set $C_1$. If the recipient 105 determines that the verification condition is not satisfied, i.e. that $e(Prv_{reci}, gp_{ub}) \neq e(H_1(ID_{reci}), H_1(ID_{TC}))$, then the recipient 105 aborts and does not compute the first ciphertext set.

In embodiments in which the verification condition is satisfied, i.e. when the recipient 105 determines $e(Prv_{reci}, gp_{ub}) = e(H_1(ID_{reci}), H_1(ID_{TC}))$, the recipient 105 may be configured, according to the Encrypt1 algorithm, to randomly generate a random secret key denoted by $\sigma$, to determine a sender public key $g_{send} = H_1(ID_{send})$ by applying the first cryptographic hash function $H_1$ to the sender identifier $ID_{send}$, and to determine a first intermediate value denoted by $r = H_3(\sigma, pub_1, pub_2)$ by applying the third cryptographic hash function $H_3$ to the random secret key $\sigma$, the first public session key $pub_1$, and to the second public session key $pub_2$. The recipient 105 may be further configured to:
determine the first ciphertext $V_1$ by applying an exponentiation function of a basis equal to the trusted user public key $gp_{ub}$ and an exponent equal to the first intermediate value r such that $V_1 = g_{pub}^r$. The exponentiation function may be replaced by a scalar multiplication such that $V_1 = [r]gp_{ub}$ if the trusted center public key $gp_{ub}$ corresponds to a point of an elliptic curve;
determine the second ciphertext $U_1$ by adding the random secret key $\sigma$ to a value $H_2$ $(e(g_{send}^r, H_1(ID_{TC})))$, the value being determined by the application of the second cryptographic hash function $H_2$ to the output $e(g_{send}^r, H_1(ID_{TC}))$ of the application of the bilinear map e to a first input $g_{send}^r$ and a second input $H_1(ID_{TC})$, the first input $g_{send}^r$ being given by the application of an exponentiation function of a basis given by the sender public key $g_{send}$ and an exponent given by the intermediate value r, the second input $H_1(ID_{TC})$ being determined by the application of the first cryptographic hash function $H_1$ to the trusted center identifier $ID_{TC}$, the second ciphertext is according expressed as $U_1 = \sigma + H_2(e(g_{send}^r, H_1(ID_{TC})))$. The addition operation may be performed over $\mathbb{F}_2[x]$ in which case, the addition operation is an XOR operation;
determine the third ciphertext $W_{11}$ by applying a cipher algorithm $E_\sigma(.)$ to the first public session key $pub_1$ such that $W_{11} = E_\sigma(pub_1)$, the cipher algorithm using the random secret key $\sigma$ as encryption key;
determine the fourth ciphertext $W_{12}$ by applying the cipher algorithm $E_\sigma(.)$ to the second public session key $pub_2$ such that $W_{12} = E_\sigma(pub_2)$;
determine the fifth ciphertext $Y_1$ by applying the second cryptographic hash function $H_2$ to the output of the application of the bilinear map exponent the first intermediate value $(e(Prv_{reci}, g_{send}))^r$, the output e $(Prv_{reci}, g_{send})$ being obtained by applying the bilinear map e to the recipient partial private key $Prv_{reci}$ and the sender public key $g_{send}$. Accordingly, the fifth ciphertext is given by $Y_1 = H_2((e(Prv_{reci}, g_{send}))^r)$.

The encryption of the public session keys by the recipient 105 is not performed to guarantee the data confidentiality, but it is performed to make more difficult the modification of the public session keys during its transfer over the link 107 potentially unsecure, from the recipient 105 to the sender 103.

According to some embodiments, upon reception of the first ciphertext set $C_1$ from the recipient 105, the sender 103 may be configured to verify the identity of the recipient and to decrypt the two public session keys by applying a Decrypt1 algorithm that takes as inputs the sender identifier, the sender partial private key, the recipient identifier, the first ciphertext set and the system parameters and outputs decrypted two public session keys. Accordingly, the sender 103 may be configured to:
determine a recipient public key $g_{reci}$ by applying the first cryptographic hash function $H_1$ to the recipient identifier $ID_{reci}$ such that $g_{reci} = H_1(ID_{reci})$;
determine a secret key $\sigma$ by applying a subtraction operation to the second ciphertext $U_1$ and the output $H_2(e(Prv_{send}, V_1))$ of the application of the second cryptographic hash function $H_2$ to the bilinear map e applied to the sender partial private key $Prv_{send}$ and the first ciphertext $V_1$, the secret key $\sigma$ is accordingly expressed as $\sigma = U_1 - H_2(e(Prv_{send}, V_1))$. The subtraction operation may be performed over $\mathbb{F}_2[x]$ in which case, the subtraction operation is an XOR operation;
decrypt the first public session key by applying a decipher $D_\sigma(.)$ to the third ciphertext $W_{11}$, the decipher using the secret key $\sigma$ as a decryption key, which provides a recovered first public session key given by $pub_1 = D_\sigma(W_{11})$;

decrypt the second public session key by applying the decipher $D_\sigma(.)$ to the fourth ciphertext $W_{12}$, which provides a recovered second public session key given by $pub_2=D_0(W_{12})$;

determine a recovered intermediate value $r=H_3(\sigma,pub_1,pub_2)$ by applying the third cryptographic hash function $H_3$ to the secret key $\sigma$, the recovered first public session key $pub_1$, and the recovered second public session key $pub_2$;

The sender 103 may be configured to verify the recipient identity by checking a verification condition, the verification condition being satisfied if the sender 103 determines that the fifth ciphertext $Y_1$ is equal to the output $H_2((e(Prv_{send}, g_{reci}))^r)$ of the application of the second cryptographic hash function $H_2$ to an input value $e(Prv_{send}, g_{reci}))^r$, the input value being given by the output $e(Prv_{send}, g_{reci})$ of the application of the bilinear map e to the sender partial private key $Prv_{send}$ and the recipient public key $g_{reci}$ to the power the recovered intermediate value r. Accordingly, the verification condition is satisfied if the sender 103 determines that $Y_1=H_2((e(Prv_{send}, g_{reci}))^r)$. If the sender 103 determines that the verification condition $Y_1=H_2((e(Prv_{send}, g_{reci}))^r)$ is not satisfied, then the sender 103 aborts.

According to the embodiments of the invention, the sender 103 is configured to send an encrypted message C(M) to the recipient 105. The sender 103 may be configured to determine the encrypted message C(M) by encrypting an original message $M \in \mathcal{M}$ using the two public keys such that the encrypted message is sent to the recipient 105 as a part of a second ciphertext set denoted by $C_2$ according to an Encrypt2 algorithm that takes as inputs the recipient identifier, the sender partial private key, the sender identifier, a given message M and the two public session keys, and outputs the second ciphertext set. According to the Encrypt2 algorithm, the sender 103 may be configured to determine the second ciphertext set $C_2$ if the sender 103 checks that two verification conditions are satisfied, the two verification conditions comprising a trusted center identity verification condition and a public session keys verification condition. The trusted center identity verification condition is satisfied if the sender 103 determines that $e(Prv_{send}, gp_{ub})=e(H_1(ID_{send}), H_1(ID_{TC}))$ this means that if the sender 103 determines that the output $e(Prv_{send}, gp_{ub})$ of the application of the bilinear map e to the sender partial private key $Prv_{send}$ and the trusted center public key $gp_{ub}$ is equal to the output $e(H_1(ID_{send}), H_1(ID_{TC}))$ of the application of the bilinear map e to the result $H_1(ID_{send})$ of the application of the first cryptographic hash function $H_1$ to the sender identifier $ID_{send}$ and to the result $H_1(ID_{TC})$ of the application of the first cryptographic hash function $H_1$ to the trusted center identifier $ID_{T_c}$. The public session keys verification condition is satisfied if the sender 103 determines that $e(pub_1, H_1(ID_{send}))=e(pub_2, Prv_{send})$, i.e. if the sender 103 determines that the output $e(pub_1, H_1(ID_{send}))$ of the application of the bilinear map e to the first public session key $pub_1$ and to the result $H_1(ID_{send})$ of the application of the first cryptographic hash function $H_1$ to the sender identifier $ID_{send}$ is equal to the output $e(pub_2, Prv_{send})$ of the application of the bilinear map e to the second public session key $pub_2$ and to sender partial private key $Prv_{send}$.

The sender 103 verifies the trusted center public key using the sender partial private key and verifies the two public session keys. If one of the identity authentications, i.e. one of the two verification conditions, is not satisfied, then the sender 103 aborts.

In embodiments, in which the sender 103 verifies successfully the trusted center public key and the two public session keys, the sender 103 may be configured to determine the second ciphertext set $C_2=\{V, U, C(M), Y\}$, that comprises, in addition to the encrypted message C(M), a first component denoted by V, a second component denoted by U, and a third component denoted by Y. The sender 103 may be configured to:

generate a random secret key denoted by $\sigma$;

determine a recipient public key $g_{reci}$ by applying the first cryptographic hash function $H_1$ to the recipient identifier $ID_{reci}$ such that $g_{reci}=H_1(ID_{reci})$;

determine an auxiliary value denoted by $r=H_3(\sigma,M)$ by applying the third cryptographic hash function $H_3$ to the random secret key $\sigma$ and to a given message M;

determine the first component V by applying an exponentiation function of a base equal to the trusted center public key $g_{pub}$ and an exponent equal to the auxiliary value $r=H_3(\sigma,M)$ such that the first component is given by $V=g_{pub}^r=g_{pub}^{H_3(\sigma,M)}$;

determine the second component U by adding the random secret key $\sigma$ to the output $H_2(e(pub_1^r, g_{reci}))$ of the application of the second cryptographic hash function $H_2$ to the result $e(pub_1^r, g_{reci})$ of the application of the bilinear map e to the first public session key to the power the auxiliary value and to the recipient public key $g_{reci}$, the second component is accordingly expressed as $U=\sigma+H_2(e(pub_1^r, g_{reci}))$. The addition operation performed to determine the second component may be performed over $\mathbb{F}_2[x]$ in which case, the addition operation is an XOR operation;

determine an encrypted message C(M) by applying a cipher $E_\sigma$ to the given message M using the random secret key $\sigma$;

determine the third component $Y=H_2((e(Prv_{send}, g_{reci}))^r)$ by applying the second cryptographic hash function $H_2$ to the result $e(Prv_{send}, g_{reci})$ of the application of the bilinear map e to the sender partial private key $Prv_{send}$ and to the recipient public key $g_{reci}$, to the power the auxiliary value r.

Upon receiving the second ciphertext set $C_2$ from the sender 103, the recipient 105 may be configured to verify the sender identity and to recover the original message M by applying a Decrypt2 algorithm that takes as inputs the private session key, the recipient partial private key, the sender identifier, the second ciphertext set and the system parameters, and outputs a recovered original message. Accordingly, the recipient 105 may be configured to:

determine a sender public key $g_{send}$ by applying the first cryptographic hash function $H_1$ to the sender identifier $ID_{send}$ such that a $g_{send}=H_1(ID_{send})$;

determine a secret key $\sigma$ by applying a subtraction operation to the second component U comprised in the second ciphertext set $C_2$ and to the output $H_2(e(V,sk))$ of the application of the second cryptographic hash function $H_2$ to the result $e(V,sk)$ of the application of the bilinear map e to the first component V comprised in the second ciphertext set and to the private session key sk, the recipient 105 having the private session key. The secret key is accordingly expressed as $\sigma=U-H_2(e(V,sk))$;

determine the original message M by decrypting the encrypted message C(M) using a decipher $D_\sigma$ that uses said secret key as a decryption key;

determine an auxiliary value denoted by $r=H_3(\sigma,M)$ by applying the third cryptographic hash function $H_3$ to the secret key $\sigma$ and the original message M recovered by the recipient 105.

According to some embodiments, the recipient 105 may be further configured to verify the identity of the sender by checking if a sender identity verification condition is satisfied, the sender identity verification condition being satisfied if the recipient 105 determines that Y=$H_2((e(g_{send}, Prv_{reci}))^r)$ i.e. if the recipient 105 determines that the third component Y comprised in the received second ciphertext set $C_2$ is equal to the output $H_2((e(g_{send}, Prv_{reci}))^r)$ of the application of the second cryptographic hash function $H_2$ to an output result $e(g_{send}, Prv_{reci})$ to the power the auxiliary value r, the output result being determined by the application of the bilinear map e to the sender public key $g_{send}$ and the recipient partial private key $Prv_{reci}$.

According to some embodiments, the cipher/decipher $E_\sigma/D_\sigma$ may be any symmetric encryption/decryption algorithm/protocol/function such as the AES, the Triple Data Encryption algorithm, the DES (Data Encryption Standard), the Triple DES (3DES), or the RC4 (Rivest Cipher 4). The cipher/decipher $E_\sigma/D_\sigma$ may be configured to perform encryption/decryption using non-tweakable or tweakable modes of operation. Exemplary non-tweakable modes of operations comprise the Electronic Codebook mode (ECB), the Cipher Block Chaining mode (CBC), the Propagating Cipher Block Chaining mode (PCBC), the Cipher Feedback mode (CFB), the Output Feedback mode (OFB), and the Counter mode (CTR). Exemplary tweakable modes of operation comprise the XOR-Encrypt-XOR (XEX) mode and the tweakable with ciphertext stealing mode (XTS).

According to some embodiments, the sender 103 and/or the recipient 105 may be configured to generate the secret key used in the cipher algorithm and the decipher algorithm using a random number generator and/or Physically Unclonable Functions. In some embodiments, a random number generator may be chosen in a group comprising a pseudo-random number generator and a true random number generator.

There is also provided a method for sending an encrypted message M(C) from a sender 103 to a recipient 105 in an identity-based cryptosystem. The cryptosystem comprises a trusted center 101 connected to the sender 103 and the recipient 105. In the identity-based cryptosystem 100, the sender 103 is associated with a sender identifier $ID_{send}$ and the recipient is associated with a recipient identifier $ID_{reci}$.

Figure 2:
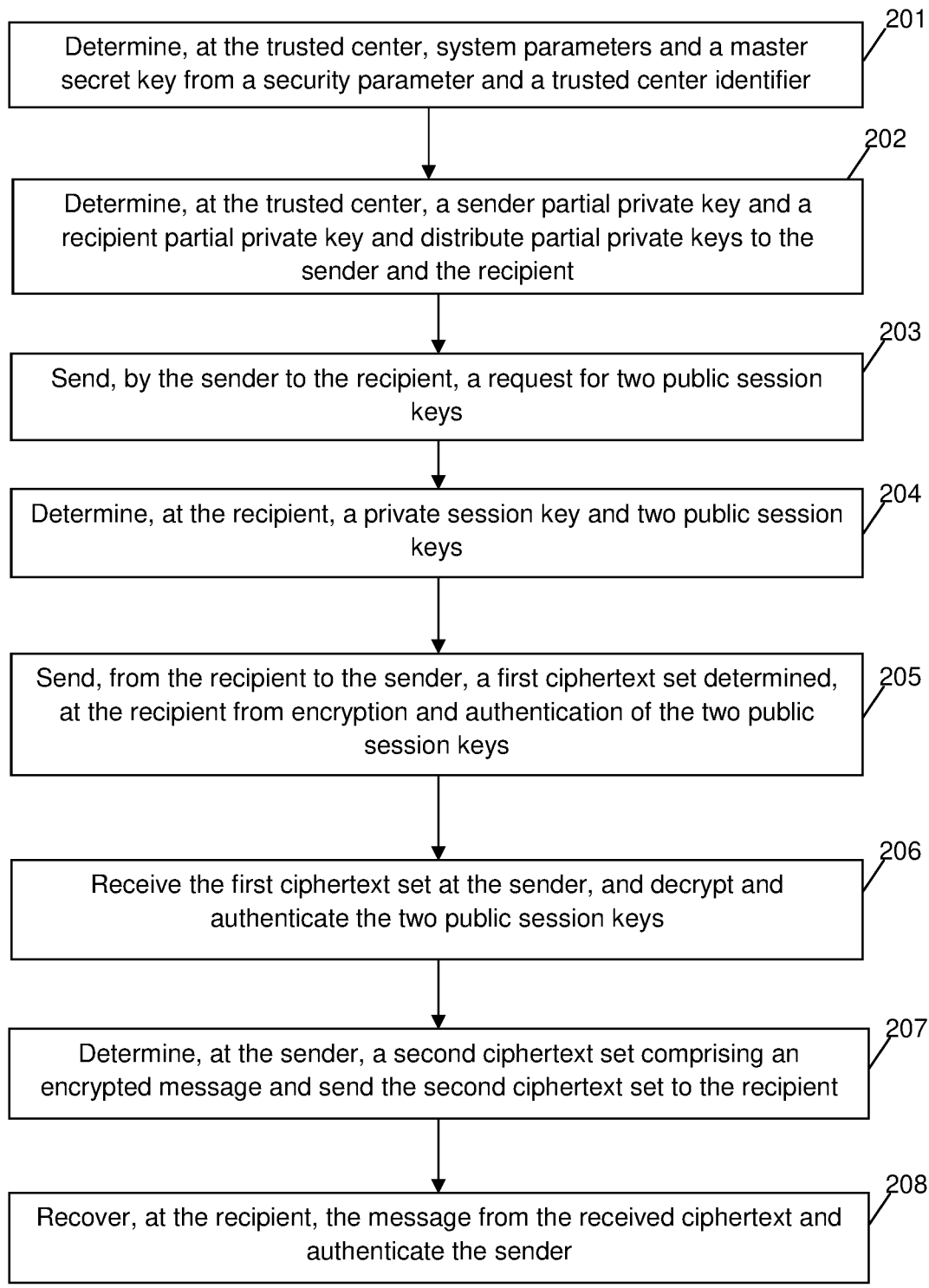
FIG. 2 is a flowchart depicting a method of encrypting and sending a message from a sender to a recipient in a cryptosystem 100, according to some embodiments of the invention.

FIG. 2 is a flowchart depicting a method for sending the encrypted message from the sender 103 to the recipient 105 according to some embodiments of the invention.

At step 201, system parameters PK=$\{p, G, G_T, e, H_1, H_2, H_3, gp_{ub}\}$ and a master private keys may be determined at the trusted center 101 from a security parameter $\lambda$ and the trusted center identifier $ID_{TC}$ according to a Setup algorithm.

At step 202, a sender partial private key $Prv_{send}$ may be determined at the trusted center 101 from the sender identifier $ID_{send}$ and a recipient partial private key $Prv_{reci}$ may be determined at the trusted center 101 from the recipient identifier $ID_{reci}$, the sender and the recipient partial private keys may be determines according to a KeyGen1 algorithm. Step 202 may comprise distributing the partial private keys, i.e. sending the sender partial private key to the sender 103 and sending the recipient partial private key to the recipient 105.

At step 203, a request for two public session keys may be sent from the sender 103 to the recipient 105.

At step 204, a private session key sk and two public session keys $pub_1$ and $pub_2$ may be determined at the recipient 103 according to a KeyGen2 algorithm.

At step 205, a first ciphertext set may be determined at the recipient 105 and sent to the sender 103, the first ciphertext set being determined from encryption and authentication of the two public keys $pub_1$ and $pub_2$ according to an Encrypt1 algorithm.

At step 206, the first ciphertext set may be received at the sender 103 and the two public keys may be decrypted and authenticated at the sender 103 using the recipient identifier $ID_{reci}$ and the sender partial private key $Prv_{send}$ according to a Decrypt1 algorithm.

At step 207, a second ciphertext set may be computed at the sender 103 and sent to the recipient 105 according to an Encrypt2 algorithm, the second ciphertext set comprising an encrypted message and being determined from the sender partial private key $Prv_{send}$, the recipient identifier $ID_{reci}$ and the two public keys $pub_1$ and $pub_2$.

At step 208, an original message M may be recovered at the recipient from the received second ciphertext set and the sender 103 may be authenticated according to a Decrypt2 algorithm.

Figure 3:
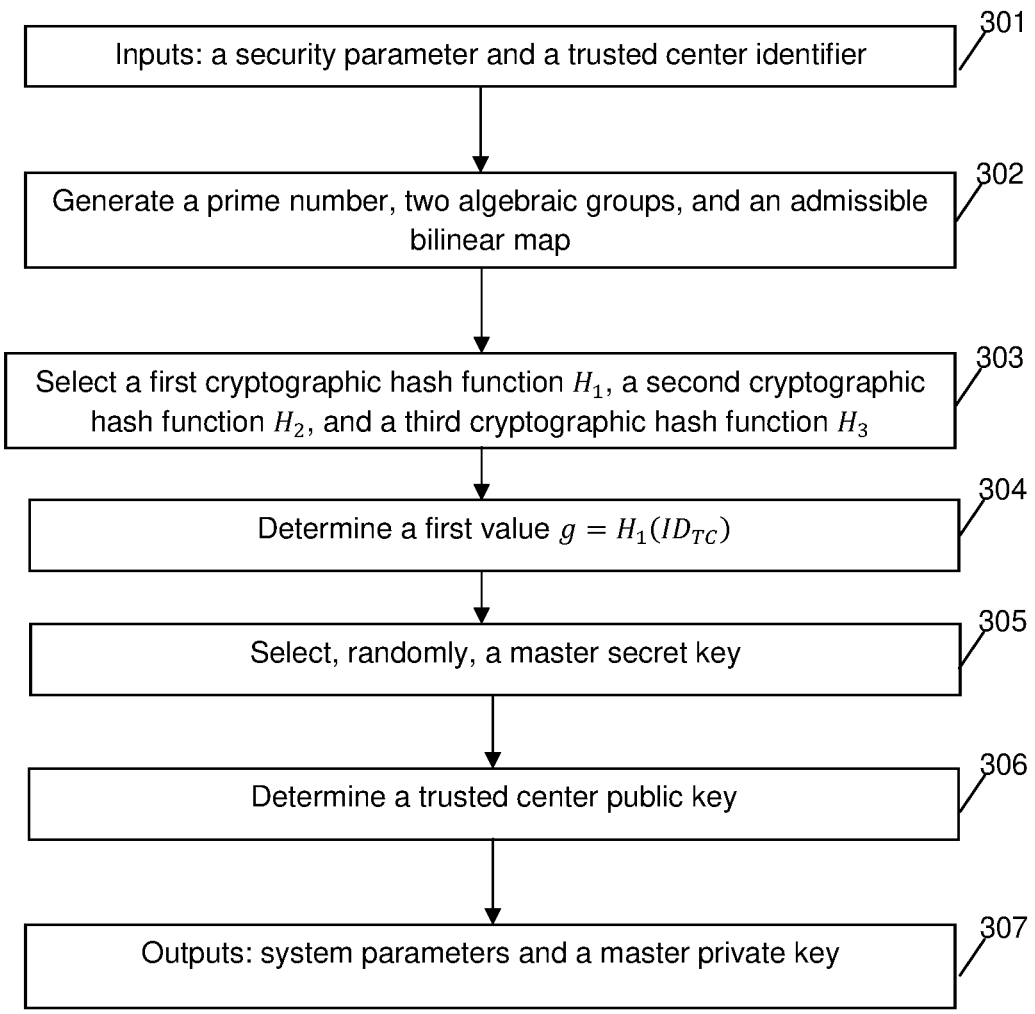
FIG. 3 is a flowchart depicting a method for determining at the trusted center 101 system parameters and a master private key s according to a setup algorithm in accordance with some embodiments of the invention.

FIG. 3 is a flowchart depicting a method of determining system parameters PK=$\{p, G, G_T, e, H_1, H_2, H_3, gp_{ub}\}$ and a master private keys according to a Setup algorithm, the system parameters comprising a prime number p, two algebraic groups G and $G_T$ of order equal to the prime number p, an admissible bilinear map e, a first cryptographic hash function $H_1$, a second cryptographic hash function $H_2$, a third cryptographic hash function $H_3$, and a trusted center public key $gp_{ub}$ associated with the trusted center identifier $ID_{TC}$.

At step 301, input parameters of the setup algorithm may be received, including a security parameter denoted by $\lambda \in \mathbb{Z}^+$ and a trusted center identifier $ID_{TC}$.

At step 302, a prime number p, two algebraic groups G and $G_T$ and an admissible bilinear map e may be determined by running a Bilinear Diffie-Hellman parameter generator that takes as input the security parameter $\lambda$ and outputs a prime number $p$, the description of two groups G and $G_T$ and the description of an admissible bilinear map e: G×G→$G_T$.

At step 303, a first cryptographic hash function $H_1$: $\{0,1\}^n$→G, a second cryptographic hash function $H_2$: $G_T$→$\{0,1\}^n$, and a third cryptographic hash function $H_3$: $\{0,1\}^n \times \{0,1\}^n \to \mathbb{Z}_p^n$ may be selected, for example among a predefined set of cryptographic hash functions. The cryptographic hash function $H_1$, $H_2$ and $H_3$ may be random oracles.

At step 304, a first value g may be determined by applying the first cryptographic hash function $H_1$ to the trusted center identifier $ID_{TC}$ such that g=$H_1(ID_{TC})$.

At step 305, a master secret key s $\in \mathbb{Z}_p^*$ may be selected randomly.

At step 306, a trusted center public key $gp_{ub}$ may be determined by applying an exponentiation function defined by a base and an exponent, the base being equal to the first value g, and the exponent being equal to the master private key sk such that $gp_{ub}$=$g^s$. In some embodiments in which the first value g corresponds to a point of an elliptic curve, the exponentiation function may be reduced to a scalar multiplication function according to which the trusted center public key $gp_{ub}$ is given by the product of the first value and the scalar s according to $gp_{ub}$=[s]g.

At step 307, the system parameters PK=$\{p, G, G_T, e, H_1, H_2, H_3, gp_{ub}\}$ and the master secret key s may be output. The system parameters may be disseminated to the sender 103 and the recipient 105, while the master secret key may be kept secret at the trusted center 101.

Figure 4:
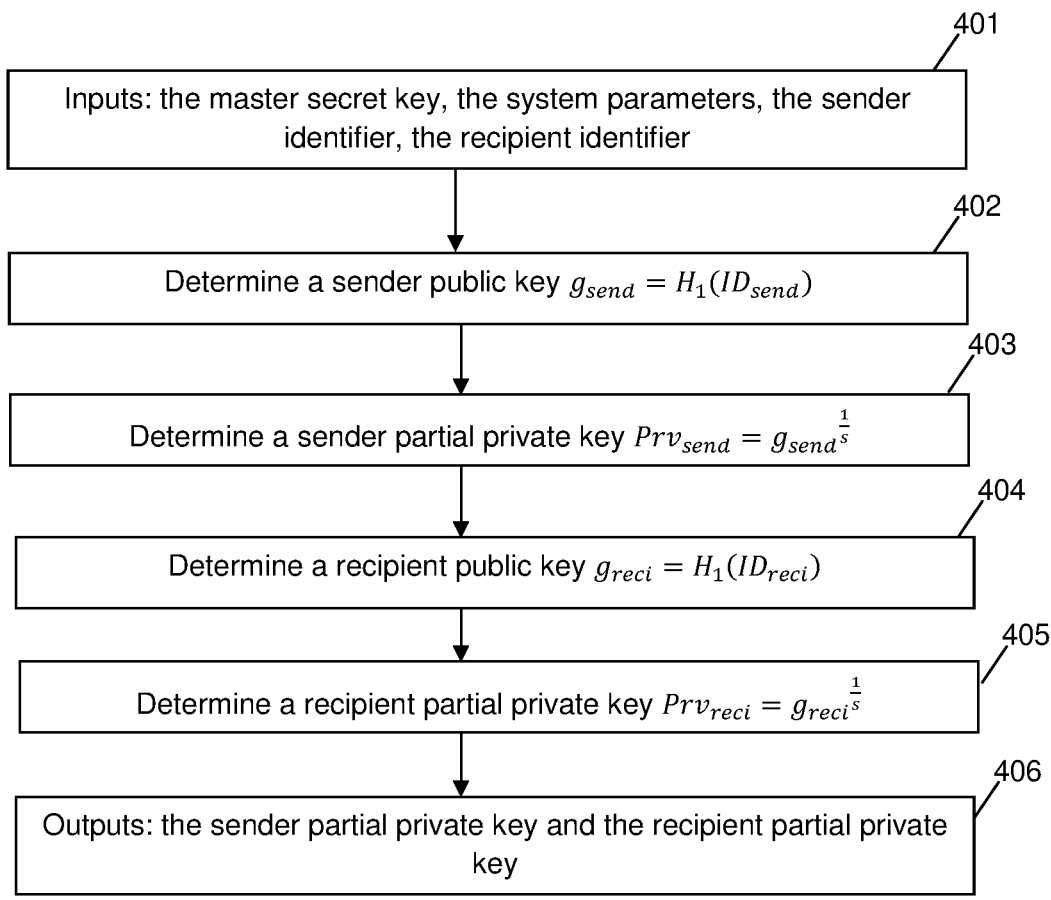
FIG. 4 is a flowchart depicting a method for determining at the trusted center 101 a sender partial private key and a recipient partial private key according to the KeyGen1 algorithm in accordance with some embodiments of the invention.

FIG. 4 is a flowchart depicting a method for determining a sender partial private key $Prv_{send}$ and a recipient partial private key $Prv_{reci}$ according to the KeyGen1 algorithm. This algorithm is executed by the trusted center 101.

At step 401, the inputs of the KeyGen1 algorithm may be received, including the master secret key s, the system parameters PK, the sender identifier $ID_{send}$, and the recipient identifier $ID_{reci}$.

At step 402, a sender public key $g_{send}$ may be by applying the first hash function $H_1$ to the sender identifier $ID_{send}$ such that $g_{send}=H_1(ID_{send})$.

At step 403, a sender partial private key $Prv_{send}$ may be determined by applying an exponentiation function defined by a base and an exponent, the base being equal to the sender public key $g_{send}$, and the exponent being equal to the inverse of the master secret key $$\frac{1}{s}$$

such that $$Prv_{send} = g_{send}^{\frac{1}{s}}.$$

in embodiments in which the sender public key corresponds to a point of an elliptic curve, the exponentiation function may be replaced with a scalar multiplication function according to which $$Prv_{send} = \left[\frac{1}{s}\right] Prv_{send}.$$

At step 404, a recipient public key $g_{reci}$ may be determined by applying the first hash function $H_1$ to the recipient identifier $ID_{reci}$ Such that $g_{reci}=H_1(ID_{reci})$.

At step 405, a recipient partial private key $Prv_{reci}$ may be determined by applying an exponentiation function defined by a base and an exponent, the base being equal to the recipient public key $g_{reci}$, and the exponent being equal to the inverse of the master secret key $$\frac{1}{s}$$

such that $$Prv_{reci} = g_{reci}^{\frac{1}{s}}.$$

In embodiments in which the recipient public key corresponds to a point of an elliptic curve, the exponentiation function may be replaced with a scalar multiplication function according to which $$Prv_{reci} = \left[\frac{1}{s}\right] g_{reci}.$$

At step 406, the sender partial private key and the recipient partial private key may be output. In particular, the sender partial private key may be sent to the sender 103 and the recipient partial private key may be sent to the recipient 105.

Figure 5:
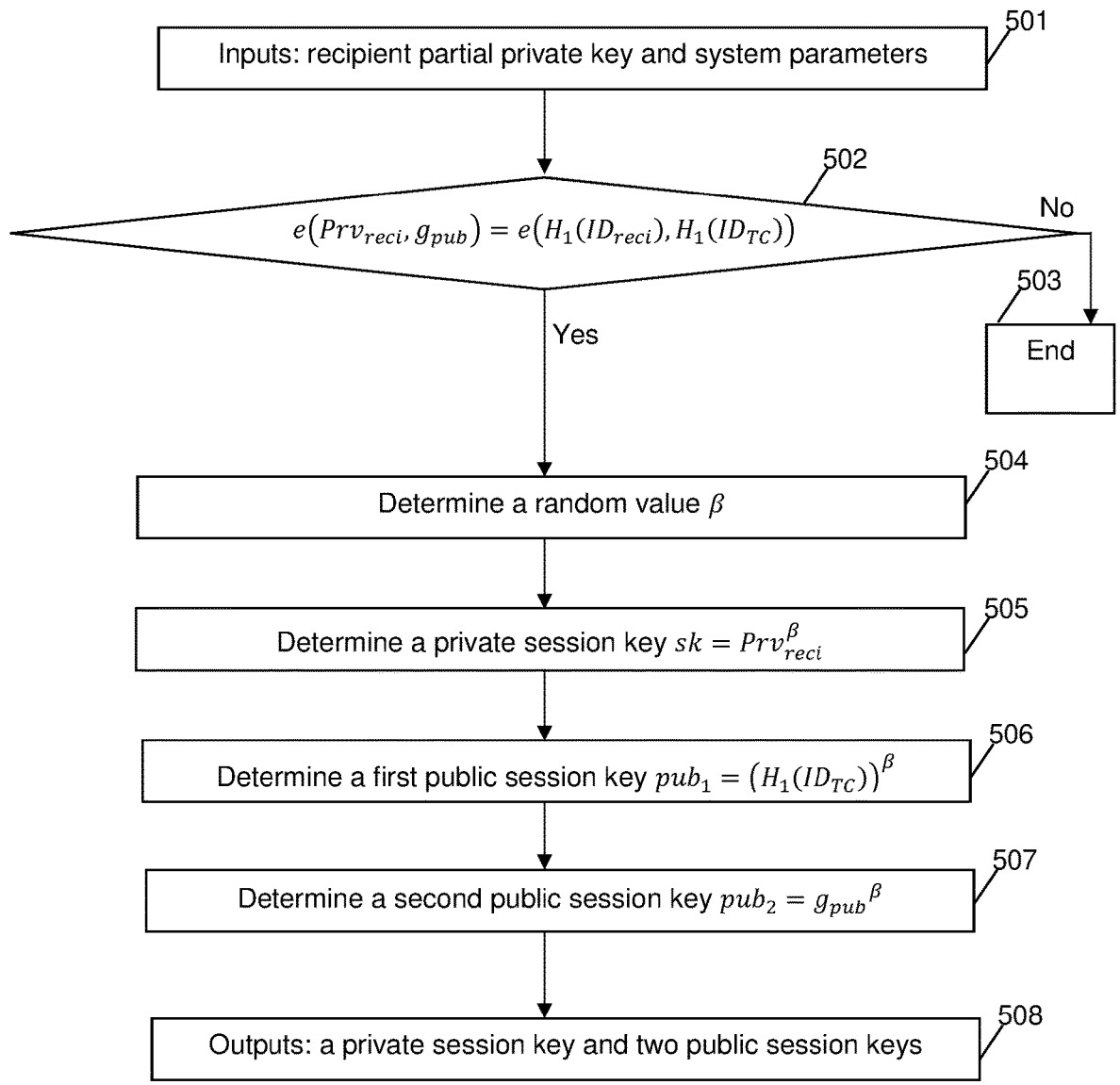
FIG. 5 is a flowchart depicting a method for determining at the recipient 105 a private session key and two public session keys according to the KenGen2 algorithm in accordance with some embodiments of the invention.

FIG. 5 is a flowchart depicting a method for determining a private session key sk and two public session keys $pub_1$ and $pub_2$ according to the KenGen2 algorithm. This algorithm is executed by the recipient 105.

At step 501, the inputs of the KeyGen2 algorithm may be received, including the recipient partial private key $Prv_{reci}$ and the system parameters PK.

At step 502, a verification condition may be checked. The verification condition may compare a first value $e(Prv_{reci}, g_{pub})$ to a second value $e(H_1(ID_{reci}), H_1(ID_{TC}))$, the first value being determined previously at step 502 by the application of the bilinear map e to the recipient partial private key $Prv_{reci}$ and to the trusted center public key $g_{pub}$, and the second value being previously determined, at step 502, by the application of the bilinear map e to the output $H_1(ID_{reci})$ of the first cryptographic hash function $H_1$ applied to the recipient identifier $ID_{reci}$ and to the output $H_1(ID_{TC})$ of the first cryptographic hash function $H_1$ applied to the trusted center identifier $ID_{TC}$.

If it is determined at step 502 that the verification condition is not satisfied, then the processing may be end at step 503.

If is determined at step 502 that the verification condition is satisfied, then steps 504 to 507 may be performed to determine a private session key and two public session keys.

At step 504, a random value denoted by β may be determined.

At step 505, a private session key sk may be determined by applying an exponentiation function of a base equal to the recipient partial private key $Prv_{reci}$ and an exponent equal to the random value β such that $sk=Prv_{reci}$. In embodiments in which the recipient partial private key corresponds to a point of an elliptic curve, the exponentiation function may be replaced by a scalar multiplication function according to which the private session key is given by $sk=[\beta]Prv_{reci}$.

At step 506, a first public session key $pub_1$ may be determined by applying an exponentiation function of a base equal to the output $H_1(ID_{TC})$ of the application of the first cryptographic hash function $H_1$ to the trusted center identifier $ID_{TC}$ and an exponent equal to the random value β such that $pub_1=(H_1(ID_{TC}))^\beta$. In embodiments in which the output $H_1(ID_{TC})$ corresponds to a point of an elliptic curve, the exponentiation function may be replaced by a scalar multiplication according to which $pub_1=[\beta]H_1(ID_{TC})$, β being a scalar. At step 507, a second public session key $pub_2$ may be determined by applying an exponentiation function of a base equal to the trusted center public key $g_{pub}$ and an exponent equal to the random value β such that $pub_2=g_{pub}^\beta$. In embodiments in which the trusted center public key $g_{pub}$ corresponds to a point of an elliptic curve, the exponentiation function may be reduced to a scalar multiplication function according to which the second public session key $pub_2$ is determined according to $pub_2=[\beta]g_{pub}$. In such embodiments, the exponent β is a scalar value.

At step 508, the private session key and the two public keys may be output.

Figure 6:
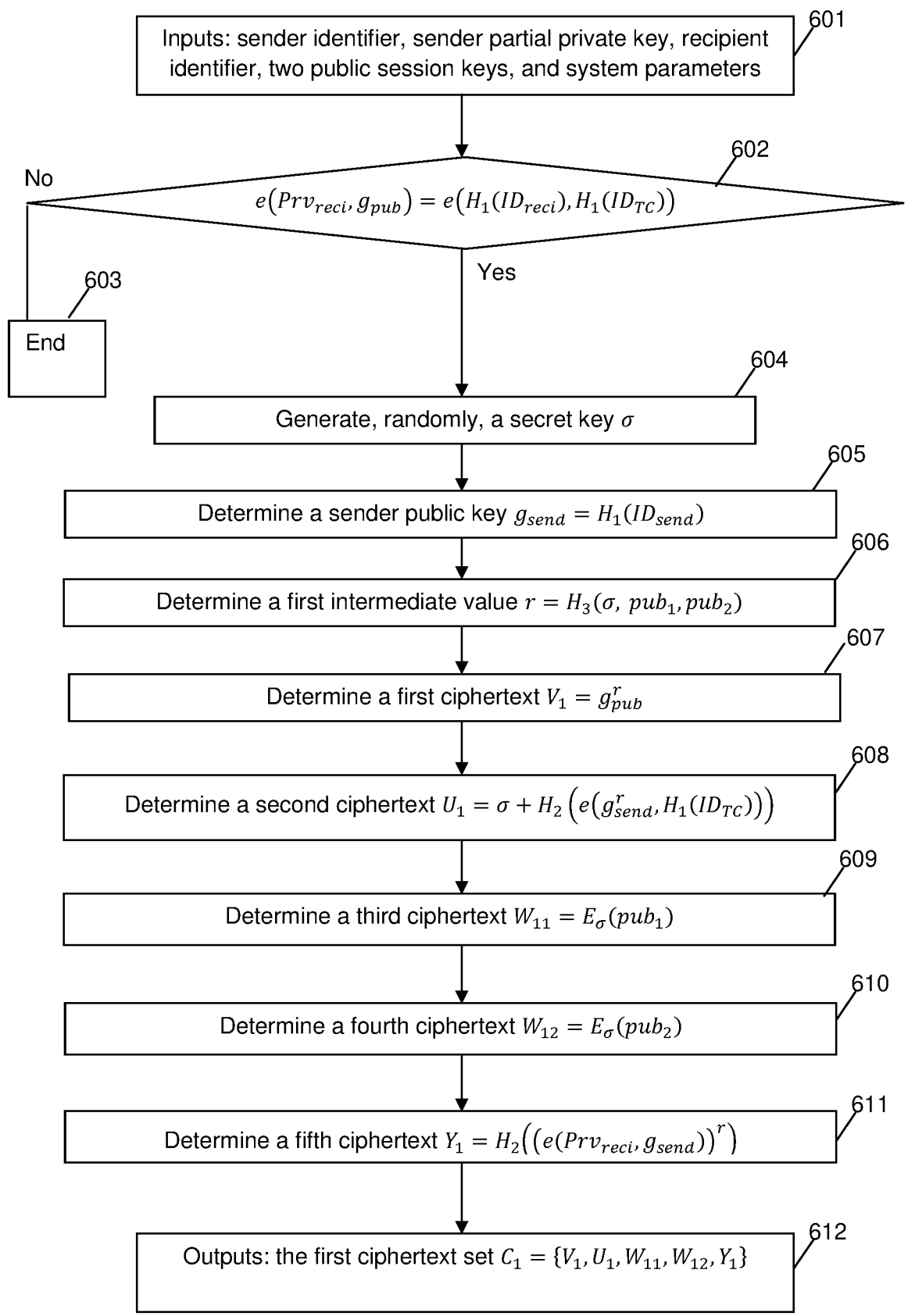
FIG. 6 is a flowchart depicting a method for determining at the recipient 105 a first ciphertext set according to the Encrypt1 algorithm in accordance with some embodiments of the invention.

FIG. 6 is a flowchart depicting a method for determining a first ciphertext set according to the Encrypt1 algorithm, the first ciphertext set $C_1=\{V_1, U_1, W_{11}, W_{12}, Y_1\}$ comprising a first ciphertext $V_1$, a second ciphertext $U_1$, a third ciphertext $W_{11}$, a fourth ciphertext $W_{12}$, and a fifth ciphertext $Y_1$. This algorithm is executed by the recipient 105.

At step 601, input parameters of the Encrypt1 algorithm may be received, including the sender identifier $ID_{send}$, the sender partial private key $Prv_{send}$, the recipient identifier $ID_{reci}$, the two public session keys $pub_1$ and $pub_2$ and the system parameters PK.

At step 602, a verification condition may be checked verify the trusted center public key using the recipient partial private key. The verification condition compares $e(Prv_{reci}, g_{pub})$ to $e(H_1(ID_{reci}), H_1(ID_{TC}))$.

If it is determined at step 602 that the verification condition is not satisfied, i.e. if it is determined that $e(Prv_{reci}, g_{pub}) \neq e(H_1(ID_{reci}), H_1(ID_{TC}))$, then the processing may be end at step 603.

If it is determined at step 602 that the verification condition is satisfied, i.e. if it is determined that $e(Prv_{reci}, g_{pub}) = e(H_1(ID_{reci}), H_1(ID_{TC}))$, then steps 604 to 611 may be performed to determine the first ciphertext set.

At step 604, a random secret key denoted by a may be generated.

At step 605, a sender public key $g_{send} = H_1(ID_{send})$ may be determined by applying the first cryptographic hush function $H_1$ to the sender identifier $ID_{send}$.

At step 606, a first intermediate value $r = H_3(\sigma, pub_1, pub_2)$ may be determined by applying the third cryptographic hash function $H_3$ to the random secret key $\sigma$, the first public session key $pub_1$, and to the second public session key $pub_2$.

At step 607, a first ciphertext $V_1$ may be determined by applying an exponentiation function of a basis equal to the trusted user public key $g_{pub}$ and an exponent equal to the first intermediate value r such that $V_1 = g_{pub}^r$. The exponentiation function may be replaced by a scalar multiplication such that $V_1 = [r]g_{pub}$ if the trusted center public key $g_{pub}$ corresponds to a point of an elliptic curve.

At step 608, a second ciphertext $U_1$ may be determined by adding the random secret key $\sigma$ to a value $H_2(e(g_{send}^r, H_1(ID_{TC})))$, the value being determined by the application of the second cryptographic hash function $H_2$ to the output $e(g_{send}^r, H_1(ID_{TC}))$ of the application of the bilinear map e to a first input a end and a second input $H_1(ID_{TC})$, the first input $g_{send}^r$ being given by the application of an exponentiation function of a basis given by the sender public key $g_{send}$ and an exponent given by the intermediate value r, the second input $H_1(ID_{TC})$ being determined by the application of the first cryptographic hash function $H_1$ to the trusted center identifier $ID_{TC}$, the second ciphertext is according expressed as $U_1 = \sigma + H_2(e(d_{send}^r, H_1(ID_{TC})))$. The addition operation may be performed over $\mathbb{F}_2[x]$ in which case, the addition operation is an XOR operation.

At step 609, a third ciphertext $W_{11}$ may be determined by applying a cipher algorithm $E_\sigma(.)$ to the first public session key $pub_1$ such that $W_{11} = E_\sigma(pub_1)$, the cipher algorithm using the random secret key $\sigma$ as encryption key.

At step 610, a fourth ciphertext $W_{12}$ may be determined by applying the cipher algorithm $E_\sigma(.)$ to the second public session key $pub_2$ such that $W_{12} = E_\sigma(pub_2)$.

At step 611, a fifth ciphertext $Y_1$ may be determined by applying the second cryptographic hash function $H_2$ to the output of the application of the bilinear map exponent the first intermediate value $(e(Prv_{reci}, g_{send}))^r$, the output $e(Prv_{reci}, g_{send})$ being obtained by applying the bilinear map e to the recipient partial private key $Prv_{reci}$ and the sender public key $g_{send}$. Accordingly, the fifth ciphertext is given by $Y_1 = H_2((e(Prv_{reci}, g_{send}))^r)$.

At step 612, the first ciphertext set $C_1 = \{17_1, U_1, W_{11}, W_{12}, Y_1\}$ may be output.

Figure 7:
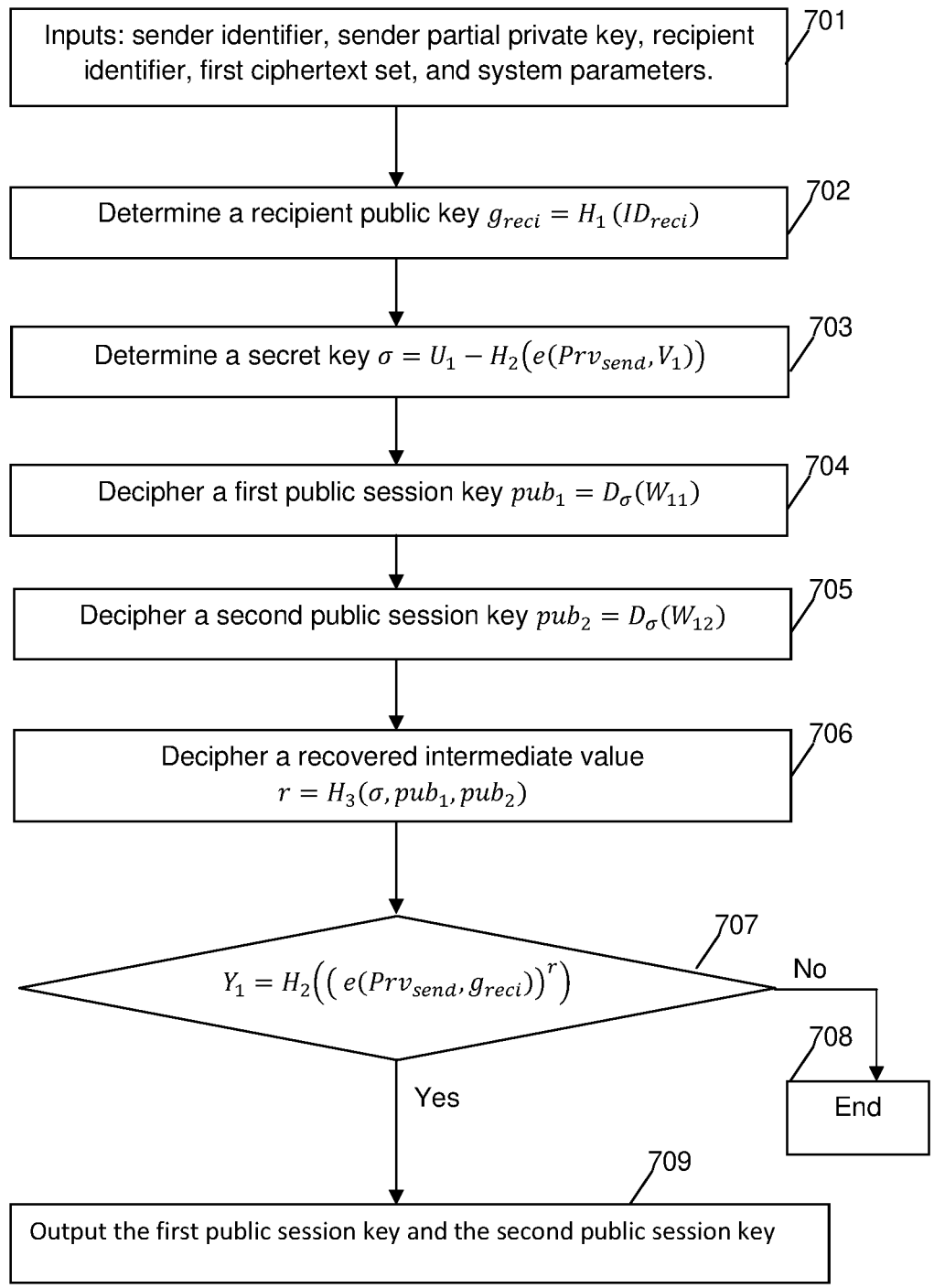
FIG. 7 is a flowchart depicting a method for decrypting and authenticating the two public session keys at the sender 103 according to the Decrypt1 algorithm in accordance with some embodiments of the invention.

FIG. 7 is a flowchart depicting a method for decrypting and authenticating the two public session keys at the sender 103 according to the Decrypt1 algorithm.

This algorithm is executed by the sender 103.

At step 701, the inputs of the Decrypt1 algorithm may be received, including the sender identifier $ID_{send}$, the sender partial private key $Prv_{send}$, the recipient identifier $ID_{reci}$, the first ciphertext set $C_1$ and the system parameters PK.

At step 702, a recipient public key $g_{reci}$ may be determined by applying the first cryptographic hash function $H_1$ to the recipient identifier $ID_{reci}$ such that $g_{reci} = H_1(ID_{reci})$.

At step 703, a secret key $\sigma$ may be determined by applying a subtraction operation to the second ciphertext $U_1$ and the output $H_2(e(Prv_{send}, V_1))$ of the application of the second cryptographic hash function $H_2$ to the bilinear map e applied to the sender partial private key $Prv_{send}$ and the first ciphertext $V_1$, the secret key $\sigma$ is accordingly expressed as $\sigma = U_1 - H_2(e(Prv_{send}, V_1))$. The subtraction operation may be performed over $\mathbb{F}_2[x]$ in which case, the subtraction operation is an XOR operation.

At step 704, a first public session key may be deciphered by applying a decipher $D_\sigma(.)$ to the third ciphertext $W_{11}$, the decipher using the secret key $\sigma$ as a decryption key, which provides a recovered first public session key given by $pub_1 = D_\sigma(W_{11})$.

At step 705, a second public session key by deciphered applying the decipher $D_\sigma(.)$ to the fourth ciphertext $W_{12}$, which provides a recovered second public session key given by $pub_2 = D_\sigma(W_{12})$.

At step 706, a recovered intermediate value $r = H_3(\sigma, pub_1, pub_2)$ may be determined by applying the third cryptographic hash function $H_3$ to the secret key $\sigma$, the recovered first public session key $pub_1$, and the recovered second public session key $pub_2$.

At step 707, the recipient identity may be verified by checking a verification condition comparing the fifth ciphertext $Y_1$ to the output $H_2((e(Prv_{send}, g_{reci}))^r)$ of the application of the second cryptographic hash function $H_2$ to an input value $e(Prv_{send}, g_{reci})^r$, the input value being given by the output $e(Prv_{send}, g_{reci})$ of the application of the bilinear map e to the sender partial private key $Prv_{send}$ and the recipient public key $g_{reci}$ to the power the recovered intermediate value r.

If it is determined at step 707 that the verification condition is not satisfied, i.e. that $Y_1 \neq H_2((e(Prv_{send}, g_{reci}))^r)$, then the processing may be interrupted at step 708.

If it is determined at step 707 that the verification condition is satisfied, i.e. that $Y_1 = H_2((e(Prv_{send}, g_{reci}))^r)$, then the recovered first public session key and the recovered second public session key may be output at step 709.

Figure 8:
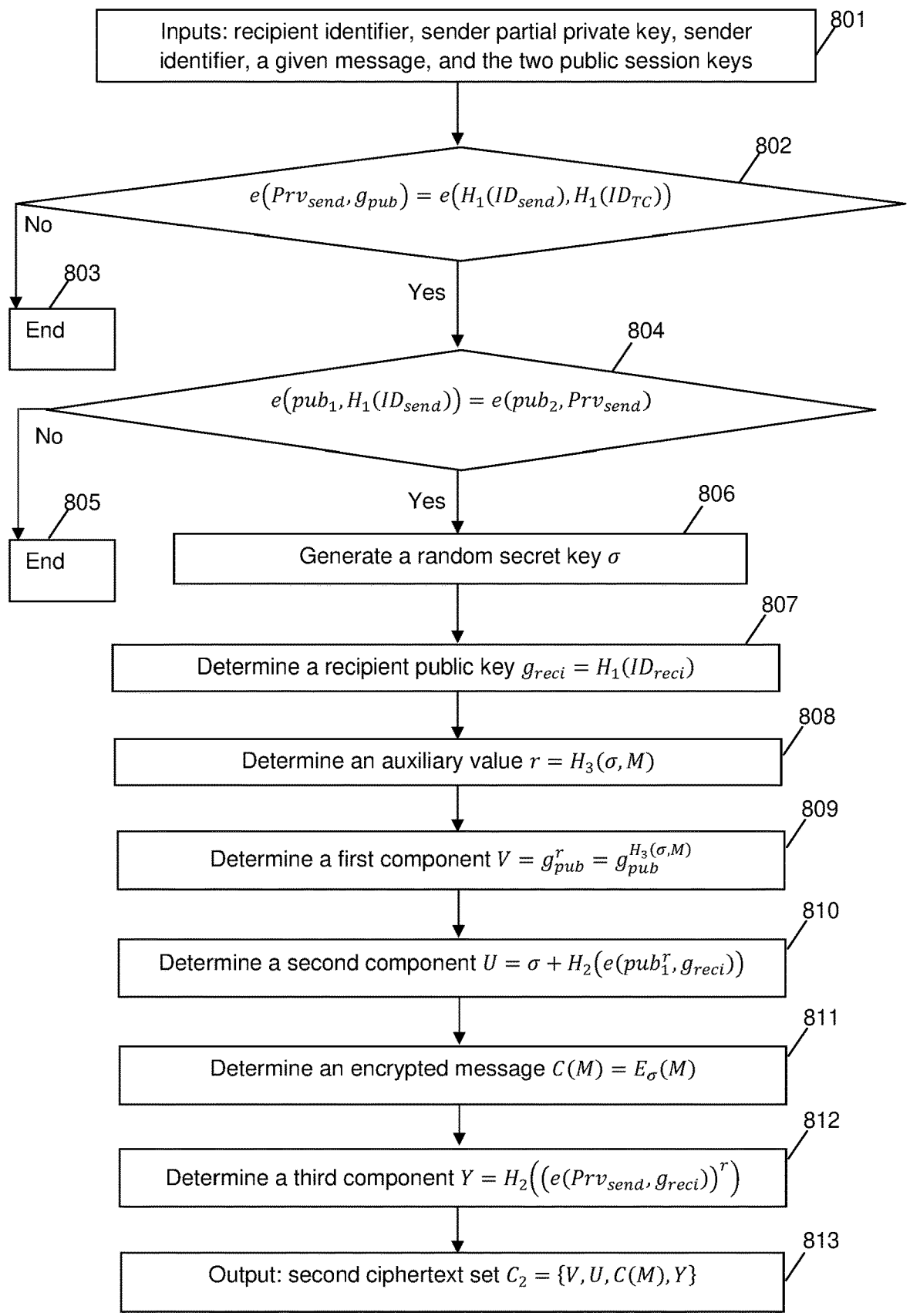
FIG. 8 is a flowchart depicting a method for computing a second ciphertext set at the sender 103 according to the Encrypt2 algorithm in accordance with some embodiments of the invention.

FIG. 8 is a flowchart depicting a method for computing a second ciphertext at the sender 103 according to the Encrypt2 algorithm. This algorithm is executed by the sender 103.

At step 801, the inputs of the Encrypt2 algorithm may be received, including the recipient identifier $ID_{reci}$, the sender partial private key $Prv_{send}$, the sender identifier $ID_{send}$, a given message M and the two public session keys $pub_1, pub_2$ recovered at the sender 103.

At step 802, a trusted center identity verification condition may be checked by comparing $e(Prv_{send}, g_{pub})$ to $e(H_1(ID_{send}), H_1(ID_{TC}))$.

If it is determined at step 802 that the trusted center identity verification condition is not satisfied i.e. $e(Prv_{send}, g_{pub}) \neq e(H_1(ID_{send}), H_1(ID_{TC}))$, then the processing may be interrupted at step 803.

If it is determined at step 802 that the trusted center identity verification session keys verification condition may be checked at step 804 comparing $e(p\,ub_1, H_{send}))$ to $e(p\,ub_2, Prv_{send})$.

If it is determined at step 804 that the public session keys verification condition is not satisfied, i.e. $e(p\,ub_1, H_1(ID_{send})) \neq e(p\,ub_2, Prv_{send})$, then the processing may be interrupted at step 805.

If it is determined at step 804 that the public session keys verification condition is satisfied, i.e. $e(p\,ub_1, H_1(ID_{send}))=e(p\,ub_2, Prv_{send})$, then steps 806 to 813 may be performed to determine the second ciphertext set $C_2=\{V, U, C(M), Y\}$ that comprises in addition to the encrypted message $C(M)$, a first component V, a second component U, and a third component Y.

At step 806, a random secret key denoted by σ may be generated.

At step 807, a recipient public key $g_{reci}$ may be determined by applying the first cryptographic hash function $H_1$ to the recipient identifier $ID_{reci}$ such that $g_{reci}=H_1(ID_{reci})$.

At step 808, an auxiliary value $r=H_3(\sigma,M)$ may be determined by applying the third cryptographic hash function $H_3$ to the random secret key σ and to a given message M.

At step 809, a first component V may be determined by applying an exponentiation function of a base equal to the trusted center public key $g_{pup}$ and an exponent equal to the auxiliary value $r=H_3(\sigma,M)$ such that the first component is given by $V = g_{pub}^r = g_{pub}^{H_3(\sigma,M)}$.

At step 810, a second component U may be determined by adding the random secret key σ to the output $H_2(e(p\,ub_1^r, g_{reci}))$ of the application of the second cryptographic hash function $H_2$ to the result $e(p\,ub_1^r, g_{reci})$ of the application of the bilinear map e to the first public session key to the power the auxiliary value and to the recipient public key $g_{reci}$ the second component is accordingly expressed as $U=\sigma+H_2(e(p\,ub_1^r, g_{reci}))$. The addition operation performed to determine the second component may be performed over $\mathbb{F}_2[x]$ in which case, the addition operation is an XOR operation.

At step 811, an encrypted message C(M) may be determined by applying a cipher E to the given message M using the random secret key σ such that $C(M)=E_\sigma(M)$.

At step 812, a third component $Y=H_2((e(Prv_{send}, g_{reci}))^r)$ may be determined by applying the second cryptographic hash function $H_2$ to the result $e(Prv_{send}, g_{reci})$ of the application of the bilinear map e to the sender partial private key $Prv_{send}$ and to the recipient public key $g_{reci}$, to the power the auxiliary value r.

At step 813, the second ciphertext set $C_2=\{V, U, C(M), Y\}$ may be output.

Figure 9:
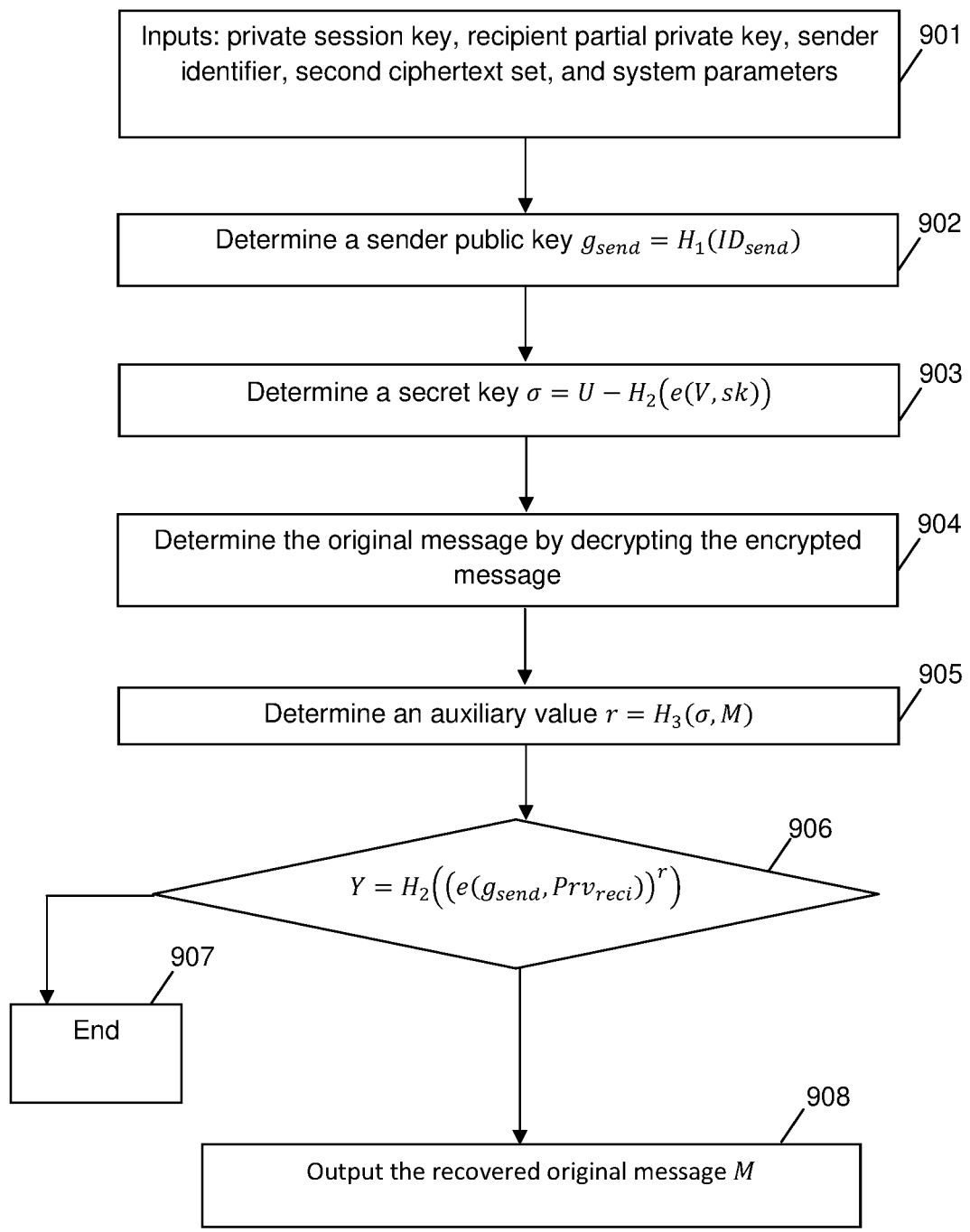
FIG. 9 is a flowchart depicting a method for recovering an original message at the recipient 105 according to the Decrypt2 algorithm in accordance with some embodiments of the invention.

FIG. 9 is a flowchart depicting a method for recovering an original message at the recipient 105 according to the Decrypt2 algorithm. This algorithm is executed by recipient 105.

At step 901, the inputs of the Decrypt2 algorithm may be received, including the private session key sk, the recipient partial private key $Prv_{reci}$, the sender identifier $ID_{send}$, the second ciphertext set $C_2$ and the system parameters PK.

At step 902, a sender public key $g_{send}$ may be determined by applying the first cryptographic hash function $H_1$ to the sender identifier $ID_{send}$ such that $g_{send}=H_1(ID_{send})$.

At step 903, a secret key σ may be determined by applying a subtraction operation to the second component U comprised in the second ciphertext set $C_2$ and to the output $H_2(e(V,sk))$ of the application of the second cryptographic hash function $H_2$ to the result $e(V,sk)$ of the application of the bilinear map e to the first component V comprised in the second ciphertext set and to the private session key sk, the recipient 105 having the private session key. The secret key is accordingly expressed as $\sigma=U-H_2(e(V,sk))$. The subtraction operation performed to determine the secret key may be performed over $\mathbb{F}_2[x]$ in which case, the subtraction operation is an XOR operation.

At step 904, the original message M may be determined/recovered by decrypting the encrypted message C(M) using a decipher $D_\sigma$ that uses the secret key σ as a decryption key.

At step 905, an auxiliary value $r=H_3(\sigma,M)$ may be determined/computed by applying the third cryptographic hash function $H_3$ to the secret key σ and the original message M recovered at step 904.

At step 906, the identity of the sender 103 may be verified by checking if a sender identity verification condition is satisfied, the sender identity verification condition comparing the third component Y to $H_2((e(g_{send}, Prv_{reci}))^r)$.

If it is determined at step 906 that the sender identity verification condition is not satisfied, i.e. if $Y \neq H_2((e(g_{send}, Prv_{reci}))^r)$, then the processing may be interrupted at step 907.

If it is determined at step 906 that the sender identity verification condition is satisfied, i.e. if $Y=H_2((e(g_{send}, Prv_{reci}))^r)$, then the recovered original message M may be output at step 908.

A proof of exchange is presented hereinafter.

For the Encrypt2 algorithm, the following holds:

$$pub_1 = g_{ID_{TC}}^\beta = H_1[ID_{TC}]^\beta;$$

$$pub_2 = g_{pub}^\beta = H_1[ID_{TC}]^{\beta s};$$

$$U = \sigma + H_2;$$

$$Y = H_2[e(Prv_{send}, g_{reci})^r]; \text{ and}$$

$$V = g_{pub}^r = H_1[ID_{TC}]^{rs}.$$

For the Decrypt2 algorithm, the following holds:

$$Prv_{reci} = g_{reci}^{\frac{1}{s}};$$

$$sk = Prv_{reci}^\beta = g_{reci}^{\frac{\beta}{s}};$$

$$\sigma = U + H_2[e(V, sk)];$$

In order to recover the symmetric secret key σ, it is obtained $$e(pub_1^r, g_{reci}) = e(g_{ID_{TC}}^{r\beta}, g_{reci}) = e(g_{ID_{TC}}, g_{reci})^{r\beta}; \text{ and}$$

$$e(V, sk) = e\left(g_{ID_{TC}}^{rs}, g_{reci}^{\frac{\beta}{s}}\right) = e(g_{ID_{TC}}, g_{reci})^{\frac{r\beta s}{s}} = e(g_{ID_{TC}}, g_{reci})^{r\beta}.$$

So, the recipient 105 can retrieve the symmetric key σ using $U+H_2[e(V,sk)]$.

For the authentication of the sender 103, it is obtained:

$$Y = H_2[e(Prv_{send}, g_{reci})^r] =$$

$$H_2\left[e\left(g_{send}^{\frac{1}{s}}, g_{reci}\right)^r\right] = H_2\left[e\left(g_{send}, g_{reci}^{\frac{1}{s}}\right)^r\right] = H_2[e(g_{send}, Prv_{reci})^r].$$

Using the sender partial private key, the trusted center 101 has the session public keys determined by the recipient 105 and sent to sender 103. The problem of key escrow is resolved using this method. The trusted center 101 may not be able to retrieve the encrypted message M. The confidentiality of the message M is thus guaranteed.

There are no links between recipient identifier and the two public session keys $pub_1$ and $pub_2$. Data encryption makes it more difficult to attack the sent session public keys. The consistency of both public session keys is verified by the sender 103.

There is also provided a program stored in a computer-readable non-transitory medium for sending an encrypted message from a sender 103 to a recipient 105 in an identity-based cryptosystem 100 comprising a trusted center 101, a sender private key being determined, at the trusted center 101 from a sender identifier associated with the sender 103, and a recipient private key being determined, at the trusted center 101 from a recipient identifier associated with the recipient 105. The program comprises instructions stored on the computer-readable storage medium, that, when executed by a processor, cause the processor to:

send a request for two public session keys $pub_1$ and $pub_2$ from the sender 103 to the recipient 105;

receive, at the sender 103, a first ciphertext set $C_1$, the first ciphertext set being determined at the recipient 105 from encryption and authentication of the two public session keys $pub_1$ and $pub_2$ determined with a private session key s from the recipient partial private key and system parameters PK associated with the cryptosystem 100;

decrypt and authenticate, by the sender 103, the two public session keys using the recipient identifier and the sender partial private key;

determine, by the sender 103, a second ciphertext set $C_2$ from the sender partial private key, the recipient identifier, and the two public keys, the second ciphertext comprising an encrypted message C(M);

send, by the sender 103, the second ciphertext set $C_2$ to the recipient 105;

recover an original message M at the recipient 105 by decrypting the encrypted message and authenticating the sender 103.

The methods and devices described herein may be implemented by various means. For example, these techniques may be implemented in hardware, software, or a combination thereof. For a hardware implementation, the processing elements of the different devices operating in the system 300 can be implemented for example according to a hardware-only configuration (for example in one or more FPGA, ASIC, or VLSI integrated circuits with the corresponding memory) or according to a configuration using both VLSI and Digital Signal Processor (DSP).

Figure 10:
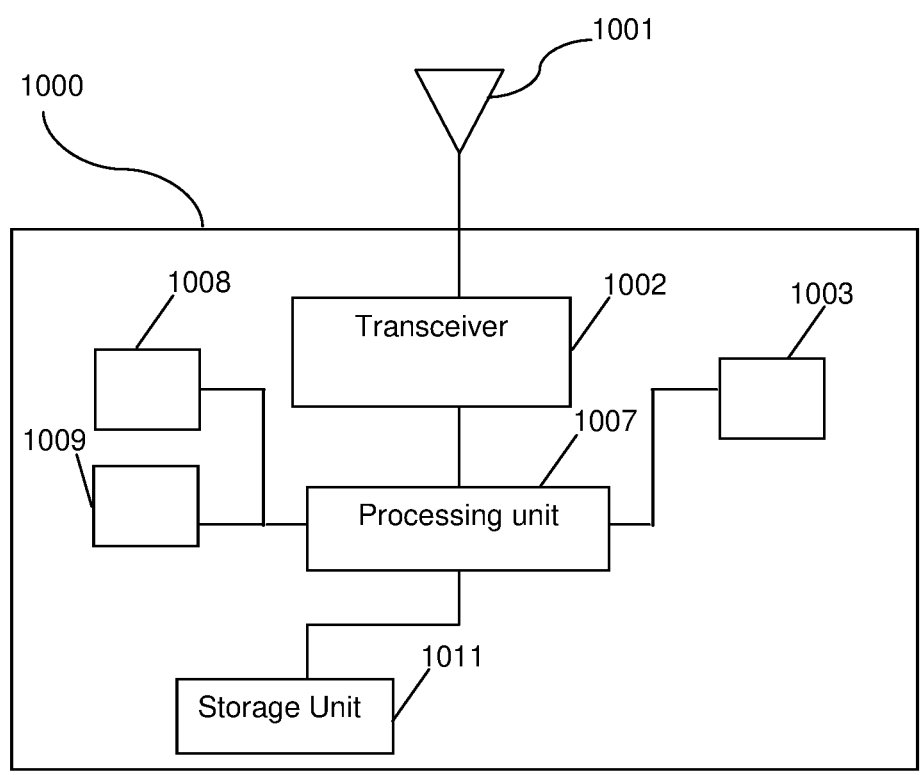
FIG. 10 is a block diagram representing an exemplary hardware/software architecture of a device 1000 operating in the cryptosystem 100 such as the trusted center 101, the sender 103, or the recipient 105, according to some embodiments of the invention.

FIG. 10 is a block diagram representing an exemplary hardware/software architecture of a device 1000 operating in the cryptosystem 100 such as the sender 103, the recipient 105, or the trusted center 101, according to some embodiments of the invention.

As illustrated, the architecture may include various computing, processing, storage, communication, sensing, and displaying units comprising:

communication circuitry comprising a transceiver 1002 and a transmit/receive element 1001 (e.g. one or more antennas) configured to connect the device to corresponding links in the cryptosystem 100 (e.g. connecting the sender 103 to the trusted center 101 and the recipient 105 or connecting the recipient 105 to the sender 103 and the trusted center 101 or connecting the trusted center 101 to both the sender 103 and the recipient 105), and to ensure transmission/reception of exchanged data (e.g. the sender identifier sent from the sender 103 to the trusted center 101, or the recipient identifier sent from the recipient 105 to the trusted center 101, or the sender partial private key sent from the trusted center 101 to the sender 103, or the recipient partial private key sent from the trusted center 101 to the recipient, or the first ciphertext set sent from the recipient 105 to the sender 103, or the second ciphertext set sent from the sender 103 to the recipient 105). The communication circuitry may support various network and air interface such as wired and wireless networks (e.g. wireless local area networks and cellular networks);

a processing unit 1002 configured to execute the computer-executable instructions to run the methods and algorithms according to the various embodiments of the invention for to perform the various required functions of the device such as data computation, encryption/decryption operations, generation and processing of random keys and values, and any functionalities required to enable the device to operate in the cryptosystem 100 according to the embodiments of the invention. The processing unit 1002 may be a general purpose processor, a special purpose processor, a DSP, a plurality of microprocessors, a controller, a microcontroller, an ASIC, an FPGA circuit, any type of integrated circuit, and the like;

a power source 1003 that may be any suitable device providing power to the device 1000 such as dry cell batteries, solar cells, and fuel cells;

a storage unit 1011 possibly comprising a random access memory (RAM) or a read-only memory used to store processed data (e.g. the sender identifier, the recipient identifier, the trusted center identifier, the system parameters, the sender public key, the recipient public key, the sender partial private key, the recipient partial private key, the master secret key, .etc.) and any data required to perform the functionalities of the device 1000 according to the embodiments of the invention;

Input peripherals 1008;

Output peripherals 1009 comprising communication means such as displays enabling for example man-to-machine interaction with the device 1000 for example for configuration and/or maintenance purposes.

The architecture of the device 1000 may further comprise one or more software and/or hardware units configured to provide additional features, functionalities and/or network connectivity.

Furthermore, the method described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A transmitter device for sending an encrypted message to a receiver device in an identity-based cryptosystem, the transmitter device being associated with a transmitter identifier, wherein the transmitter device is configured to receive a transmitter partial private key from a trusted center, said transmitter partial private key depending on the transmitter identifier associated with said transmitter device, the transmitter device being configured to:
  send a request for two public session keys to the receiver device;
  receive from the receiver device a first ciphertext set, said first ciphertext set being derived from an encryption and authentication of two public session keys;
  decrypt and authenticate the two public session keys from the first ciphertext set using a receiver identifier and the transmitter partial private key;
  determine a second ciphertext set from the transmitter partial private key, from the receiver identifier, and from the two public session keys, said second ciphertext comprising an encrypted message;
  send said second ciphertext set to the receiver device,
  wherein the transmitter device is configured to check whether a trusted center identity verification condition and/or a public session keys verification condition are verified, the trusted center identity verification condition being satisfied if an output of a bilinear map applied to the transmitter partial private key and to a trusted center public key is equal to the output of the bilinear map applied to:
    a result of a first cryptographic hash function applied to the transmitter identifier; and
    the result of the first cryptographic hash function applied to a trusted center identifier; and
  the public session keys comprising a first public session key and a second public session key, the public session keys verification condition being satisfied if the output of the bilinear map applied to the first public session key and to the result of the first cryptographic hash function applied to the transmitter identifier is equal to the output of the bilinear map applied to the second public session key and to the transmitter partial private key.

2. The transmitter device of claim 1, wherein said identity-based cryptosystem is associated with system parameters comprising said bilinear map, said first cryptographic hash function, a second cryptographic hash function, a third cryptographic hash function, and said trusted center public key associated with the trusted center, said first ciphertext set comprising a first ciphertext, a second ciphertext, a third ciphertext, a fourth ciphertext, and a fifth ciphertext, and wherein said transmitter device is configured to:
  apply the first cryptographic hash function to the receiver identifier, which provides a receiver public key;
  apply a subtraction operation between (i) the second ciphertext, and (ii) the output of the second cryptographic hash function applied to the bilinear map applied to the transmitter partial private key and to the first ciphertext, which provides a secret key;
  decipher the third ciphertext, which provides a recovered first public session key, said decipher using said secret key as a decryption key;
  decipher the fourth ciphertext, which provides a recovered second public session key;
  apply the third cryptographic hash function to said secret key, to said recovered first public session key, and to said recovered second public session key, which provides a recovered intermediate value; and
  check if the fifth ciphertext is equal to the output of the second cryptographic hash function applied to an input value, said input value being the output of the bilinear map applied to (iii) the transmitter partial private key, and (iv) to the receiver public key to power said recovered intermediate value.

3. The transmitter device of claim 1, wherein the second ciphertext set further comprises a first component, a second component, and a third component, the transmitter device being configured to:
  generate a random secret key;
  apply the first cryptographic hash function to the receiver identifier, which provides a receiver public key;
  apply a third cryptographic hash function to said random secret key and to a given message, which provides an auxiliary value;
  apply an exponentiation function of a base equal to a trusted center public key and an exponent equal to said auxiliary value, which provides the first component;
  add said random secret key to the output of a second cryptographic hash function applied to the result of the bilinear map applied to the first public session key to power the auxiliary value and to said receiver device public key, which provides the second component;
  apply a cipher to a given message using said random secret key, which provides an encrypted message; and
  apply a second cryptographic hash function to the result of the bilinear map to the power the auxiliary value, said bilinear map being applied to the transmitter partial private key and to the receiver public key, which provides the third component.

4. A receiver device for receiving an encrypted message from a transmitter device, the transmitter device being associated with a transmitter identifier, the receiver device being configured to determine two public session keys from a random value, the receiver being configured to determine a private session key by applying an exponentiation function of a base equal to a receiver partial private key and an exponent equal to said random value, the receiver device being configured to send a first ciphertext set to the transmitter device, the receiver device being configured to determine said first ciphertext set from an encryption of the two public session keys, the receiver device being configured to receive a second ciphertext set from the transmitter device comprising said encrypted message, the second ciphertext set depending on a transmitter partial private key received from a trusted center, a receiver identifier associated with said receiver device, and the two public session keys, the receiver device being configured to recover an original message by decrypting said encrypted message and authenticating the transmitter device,
  wherein the receiver partial private key depends on a receiver identifier associated with the receiver device,
  wherein the receiver device is configured to verify a trusted center public key associated with the trusted center using the receiver partial private key and to determine a private session key, two public session keys comprising a first public session key and a second public session key, and a first ciphertext set if a verification condition is satisfied, said verification condition being satisfied if the receiver device determines that a first value is equal to a second value, said first value being determined by applying a bilinear map to the receiver device partial private key and to a trusted center public key, said second value being determined by applying the bilinear map to output of a first cryptographic hash function applied to the receiver identifier and to the output of a first cryptographic hash function applied to the trusted center identifier.

5. The receiver device of claim 4, wherein system parameters comprise a prime number, two algebraic groups of order equal to said prime number, said bilinear map, said first cryptographic hash function, a second cryptographic hash function, a third cryptographic hash function, and said trusted center public key associated with a trusted center identifier.

6. The receiver device of claim 4, wherein the receiver device is configured to determine a random value and to determine said private session key by applying an exponentiation function of a base equal to the receiver partial private key and an exponent equal to said random value, said two public session keys comprising a first public session key and a second public session key, the receiver device being configured to determine said first public session key by applying an exponentiation function of a base equal to the output of an application of the first cryptographic hash function to a trusted center identifier and an exponent equal to said random value, and to determine said second public session key by applying an exponentiation function of a base equal to the trusted center public key and an exponent equal to said random value.

7. The receiver device of claim 4, wherein the first ciphertext set comprises a first ciphertext, a second ciphertext, a third ciphertext, a fourth ciphertext, and a fifth ciphertext, the receiver device being configured to randomly generate a random secret key, the receiver device being configured to determine a transmitter public key by applying the first cryptographic hash function to the transmitter device identifier, and to determine a first intermediate value by applying a third cryptographic hash function to said random secret key, to the first public session key, and to the second public session key, the receiver device being further configured to:
determine said first ciphertext by applying an exponentiation function of a basis equal to a trusted user public key and an exponent equal to said first intermediate value;
add said random secret key to a value, which provides said second ciphertext, said value being a result a second cryptographic hash function applied to the output of the bilinear map applied to a first input and a second input, said first input being the result of an exponentiation function having a basis given by a transmitter device public key and an exponent given by said intermediate value, said second input being of the result of the first cryptographic hash function to applied to the trusted center identifier;
determine said third ciphertext by applying a cipher algorithm to the first public session key, said cipher algorithm using said random secret key as encryption key;
determine said fourth ciphertext by applying a cipher algorithm to the second public session key; and
determine said fifth ciphertext by applying a second cryptographic hash function to the output of an application of a bilinear map exponent said first intermediate value, said output being obtained by applying said bilinear map to the receiver partial private key and the transmitter public key.

8. The receiver device of claim 4, wherein the second ciphertext set further comprises a first component, a second component, and a third component, said first component, the receiver device being configured to:
determine a transmitter public key by applying the first cryptographic hash function to the transmitter identifier;
determine a secret key by applying a subtraction operation to the second component comprised in the second ciphertext set and to the output of an application of a second cryptographic hash function to a result of the application of the bilinear map to the first component comprised in the second ciphertext set and to the private session key;
determine said original message by decrypting said encrypted message, said decrypting of the encrypted message including deciphering said encrypted message using said secret key as a decryption key;
determine an auxiliary value by applying a third cryptographic hash function to said secret key and said original message; and
verify the identity of the transmitter device by checking if a transmitter identity verification condition is satisfied, said transmitter identity verification condition being satisfied if the receiver device determines that the third component comprised in the second ciphertext set is equal to the output of the second cryptographic hash function applied to an output result to a power of said auxiliary value, said output result being determined by the application of the bilinear map to a transmitter device public key and the receiver device partial private key.

9. An identity-based cryptosystem comprising a trusted center, said trusted center being configured to determine system parameters and a master private key from a trusted center security parameter and a trusted center identifier, said system parameters comprising a prime number, two algebraic groups of order equal to said prime number, an admissible bilinear map, a first cryptographic hash function, a second cryptographic hash function, a third cryptographic hash function, and a trusted center public key associated with said trusted center identifier, said trusted center being configured to:
generate said prime number, said two algebraic groups and said admissible bilinear map byrunning a Bilinear Diffie-Hellman parameter generator that takes as input said trusted center security parameter;
select a first cryptographic hash function, a second cryptographic hash function, and a third cryptographic hash function from a predefined set of cryptographic hash functions;
determine a first value by applying the first cryptographic hash function to said trusted center identifier;
randomly select a master secret key; and
determine said trusted center public key by applying an exponentiation function defined by a base and an exponent, said base being equal to said first value, and said exponent being equal to said master private key, wherein the trusted center is configured to determine a transmitter partial private key and a receiver partial private key from said master secret key, said system parameters, a transmitter identifier and a receiver identifier, the trusted center being configured to determine a transmitter public key by applying the first hash function to a transmitter device identifier and to determine the transmitter partial private key by applying an exponentiation function defined by a base and an exponent, the base being equal to said transmitter public key, and the exponent being equal to an inverse of said master secret key, the trusted center being configured to determine a receiver public key by applying the first hash function to the receiver identifier and to determine the receiver partial private key by applying an exponentiation function defined by a base and an exponent, the base being equal to said receiver public key, and the exponent being equal to the inverse of said master secret key.

\* \* \* \* \*